(12) United States Patent
Hines

(10) Patent No.: US 10,894,605 B2
(45) Date of Patent: Jan. 19, 2021

(54) EFFICIENT LOW-NOISE AIRCRAFT PROPULSION SYSTEM

(71) Applicant: U. S. Aeronautics, Inc., Brampton (CA)

(72) Inventor: James Paul Hines, Stouffville (CA)

(73) Assignee: U.S. Aeronautics, Inc.

( * ) Notice: Subject to any disclaimer, the term of this patent is extended or adjusted under 35 U.S.C. 154(b) by 272 days.

(21) Appl. No.: 15/919,625

(22) Filed: Mar. 13, 2018

(65) Prior Publication Data

US 2019/0283888 A1  Sep. 19, 2019

(51) Int. Cl.
| | |
|---|---|
| B64D 27/08 | (2006.01) |
| B64C 11/00 | (2006.01) |
| F02B 37/12 | (2006.01) |
| F01P 11/10 | (2006.01) |
| F01P 3/00 | (2006.01) |
| F01N 3/10 | (2006.01) |
| B64D 13/02 | (2006.01) |
| B64D 15/04 | (2006.01) |
| B64C 11/30 | (2006.01) |
| B64D 35/06 | (2006.01) |
| B64D 13/06 | (2006.01) |

(52) U.S. Cl.
CPC .......... *B64D 27/08* (2013.01); *B64C 11/001* (2013.01); *B64C 11/30* (2013.01); *B64D 13/02* (2013.01); *B64D 13/06* (2013.01); *B64D 15/04* (2013.01); *B64D 35/06* (2013.01); *F01N 3/10* (2013.01); *F01P 3/00* (2013.01); *F01P 11/10* (2013.01); *F02B 37/12* (2013.01)

(58) Field of Classification Search
CPC ....... B64C 11/001; B64C 11/30; B64D 13/02; B64D 13/06; B64D 15/04; B64D 27/08; B64D 35/04; B64D 35/06; F02B 37/12; F01N 3/10; F01P 3/12; F01P 3/18; F01P 3/20; F01P 11/10; F01P 2060/12; F01P 2060/02; F01P 2050/20
USPC ...... 60/602, 605.1, 280, 320, 299; 244/53 B, 244/55, 57, 60; 416/21, 95
See application file for complete search history.

(56) References Cited

U.S. PATENT DOCUMENTS

| | | | |
|---|---|---|---|
| 4,426,844 A | * | 1/1984 | Nakano ................... F01N 3/043 165/73 |
| 2016/0167780 A1 | * | 6/2016 | Giovenga ............... B64C 3/385 244/7 R |

FOREIGN PATENT DOCUMENTS

CA  2602214 A1 * 3/2009 ............. B64D 27/08

OTHER PUBLICATIONS hinesaircraft.com, Nov. 19, 2007.

* cited by examiner

Primary Examiner — Thai Ba Trieu
Assistant Examiner — Dapinder Singh
(74) *Attorney, Agent, or Firm* — Hovey Williams LLP

(57) ABSTRACT

An aircraft propulsion system comprising a reciprocating liquid cooled engine housed within the fuselage driving twin fuselage mounted ducted-fans is disclosed. The propulsion system may be liquid cooled with a liquid cooled exhaust and at least one turbocharger. The ducted-fans may run fan blade tip speeds of up to 97% Mach driven by a near constant RPM engine through a continuously variable transmission. The propulsion system may be low noise and may meet environmental standards typical in the automotive industry.

15 Claims, 12 Drawing Sheets

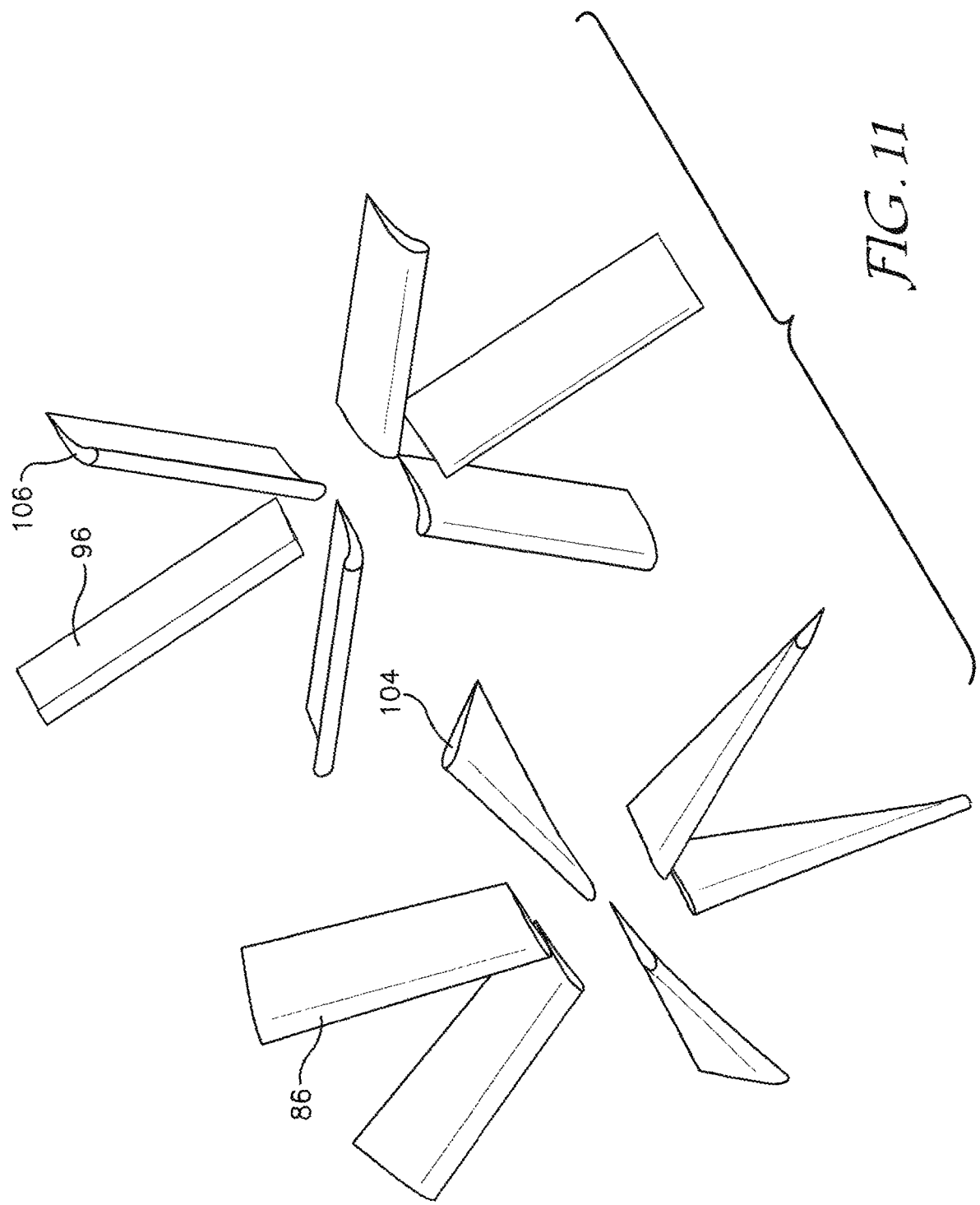

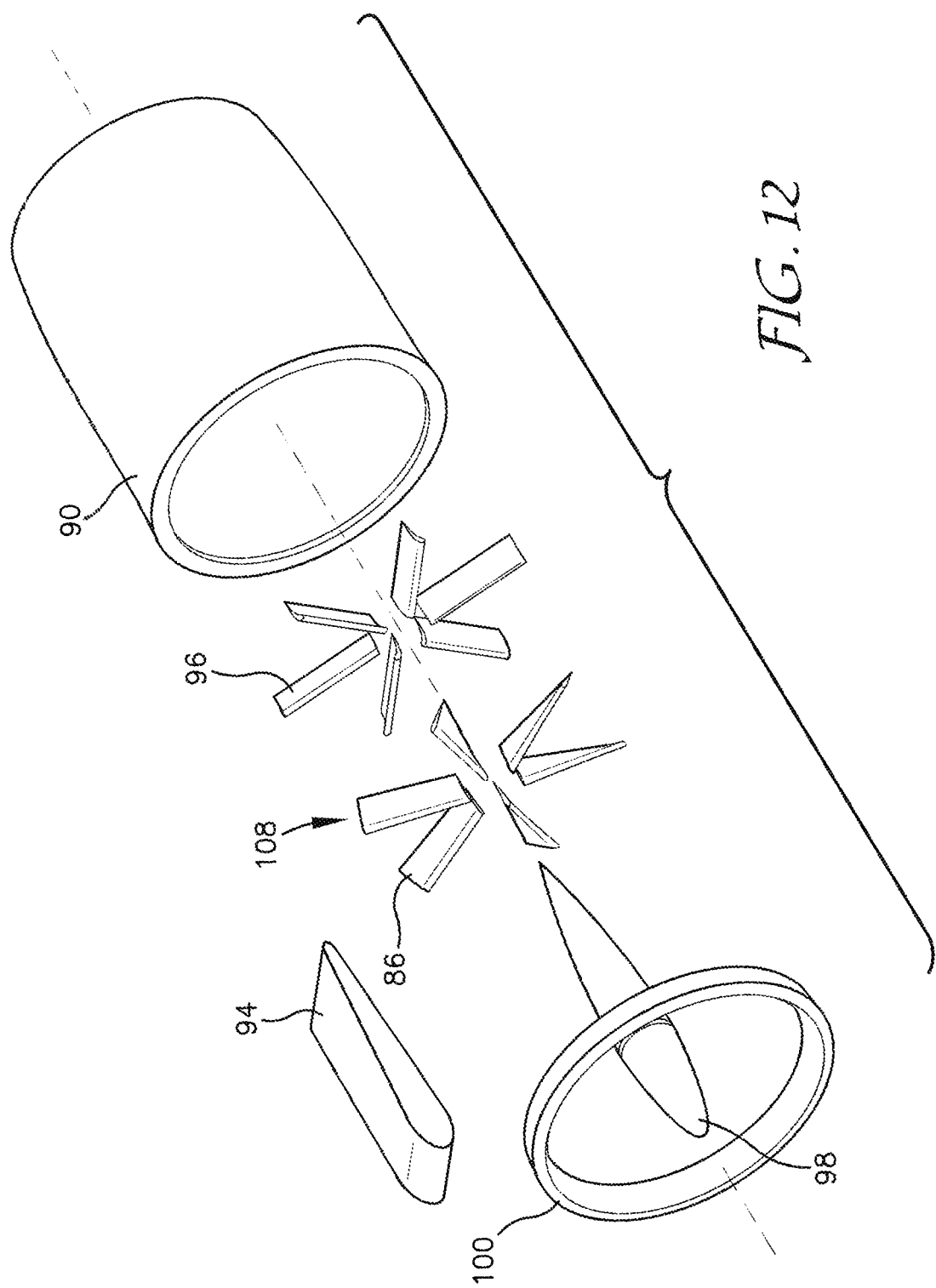

EFFICIENT LOW-NOISE AIRCRAFT PROPULSION SYSTEM

BACKGROUND

1. Field

Embodiments of the invention generally relate to a fuel-efficient aircraft. More specifically, embodiments relate to a neutrally stable ducted-fan reciprocating engine fuel-efficient aircraft.

2. Related Art

Traditionally general aviation aircraft have been single-propeller single reciprocating engine, twin-propeller twin-engine, or business-jet-style aircraft. General aviation comprises all aircraft other than military or commercial. General aviation aircraft are typically noisy and inefficient aircraft.

Propeller type general aviation aircraft are relatively inexpensive but are noisy with little to no noise suppression on the engine and no noise suppression on the exposed propellers. These types of aircraft typically do not fly at high altitudes or provide pressurization to the cabin. The engines in operation today also typically do not meet the environmental standards of today's automotive industry and expected regulations in the future.

Typical jet engines used on general aviation aircraft today are loud, relatively expensive, and extremely inefficient at low speeds such as at low revolutions per minute (RPM). Jet engine aircraft of this type are typically in the field of private jets. Typical private jets provide luxury and speed. This comes with an expensive price tag, generally into the millions of dollars.

More specifically, drawbacks in current aviation propulsion system technology relates to inefficiencies in propeller and drive train assemblies. Typical aviation drive train systems comprise a fixed ratio between the engine operating speed and the blade rotation speed. The system may be a jet engine driving a fan, a turboprop drive, a propeller, or piston engine, either geared or direct drive, turning a standard propeller. In a jet engine driven aircraft, the jet core turns the front fan through a reduction gear with fixed gear ratios. In a turboprop, a turbine drives a propeller through a large gear reduction system. In a piston engine driven system, the engine drives the propeller through either gear reduction or direct drive and the ratios are based on application. The variables in the systems are propeller pitch and fuel mixture control. The systems are further limited by propeller tip speeds and designs are based on these limitations. Jet system front fans may be designed to operate at subsonic and supersonic stages but are similarly limited by fan speeds.

Aircraft that have wing mounted engines face many obstacles as well. For example, a wing mounted engine causes the aircraft to have a large ground clearance that results in long heavy landing gear. The engines may also be close to the ground which results in Foreign Object Debris (FOD) damage to the engines when foreign objects on the runway are sucked into the engines. The low engines also create a large positive pitching moment on the aircraft which may increase drag by deflecting the control surfaces to compensate for the pitching moment. All of these drawbacks may be overcome by an aircraft with fuselage mounted engines.

Fuselage mounted engines create another drawback. The weight of the engines combined with the thrust adds a stress to the exterior of the fuselage and a large bending moment. This must be overcome with a large amount of heavy structure to support the exterior engines.

What is needed is a highly efficient high speed high altitude aircraft that is relatively inexpensive and convenient for the customer. The aircraft may overcome the above drawbacks by providing a fuselage housed engine that drives exteriorly mounted ducted-fans.

SUMMARY

At a high level, embodiments of the invention relate to a neutrally stable aircraft with an aircraft propulsion system comprising a reciprocating liquid cooled engine housed within the fuselage and driving twin fuselage mounted ducted-fans mounted on the exterior of the fuselage. The propulsion system may be liquid cooled with a liquid cooled exhaust and at least one turbocharger. The ducted-fans may run fan blade tip speeds of up to 97% Mach driven by a near constant RPM engine through a continuously variable transmission. The propulsion system may be low noise and may meet environmental standards typical in the automotive industry.

The aircraft may be an aircraft with twin ducted-fans powered by a noise insulated reciprocating engine that meets environmental standards typical of automobile engines. The aircraft may be neutrally stable and the twin fans counter rotate to negate p-factor and minimize trim drag. The transmission may provide a continuously variable gear reduction system that allows the engine to run at a near constant RPM while maintaining an optimized thrust RPM at the fan, further increasing efficiency and allowing the engine to meet green regulations. Further efficiency may be provided by a liquid cooled exhaust system that cools the exhaust prior to entering the turbochargers and the catalytic converter allowing the fuel air mixture to be leaner than typical systems today. These systems combined, may provide an aircraft that is more efficient convenient and affordable, while outperforming the aircraft of the current market in speed, altitude, and cost.

A first embodiment of the invention addresses the above-described need by providing for an aircraft propulsion system comprising a liquid cooled reciprocating engine, a liquid cooled exhaust system, and transmission housed within the aircraft fuselage. The propulsion system further comprising an exterior fuselage mounted ducted-fan assembly configured to be powered by the reciprocating engine via a drive shaft connected to the transmission, wherein the ducted-fan assembly comprises at least three blades and one stator and the dive shaft is at least partially housed within the one stator.

A second embodiment of the invention addresses the above-described need by providing an aircraft propulsion system comprising a reciprocating engine with a liquid cooled exhaust system and a continuously variable transmission housed within a fuselage, wherein the exhaust system is cooled by at least one intercooler prior to the exhaust air entering a catalytic converter. The propulsion system also comprises a ducted-fan assembly mounted to the exterior of the fuselage and driven by a drive shaft connected to the continuously variable transmission, wherein the ducted-fan assembly comprises at least three fan blades and one stator, wherein the drive shaft is at least partially housed within the one stator. The propulsion system further comprising at least one turbocharger for maintaining a near constant temperature and pressure of engine inlet air during at least one flight phase.

A third embodiment of the invention provides for an aircraft propulsion system comprising a reciprocating engine, liquid cooled exhaust system, and continuously variable transmission housed within a fuselage, wherein the exhaust system is cooled using an intercooler cooling exhaust air prior to entering a catalytic converter. The propulsion system further comprising a ducted-fan assembly mounted to the exterior of the fuselage powered by the reciprocating engine via a drive shaft connected to the continuously variable transmission. The propulsion system further comprising at least one turbocharger for maintaining a near constant temperature and pressure of engine inlet air during at least one flight phase.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 11 depicts the fan blades and stators of the exemplary embodiment of the ducted-fan depicted in FIGS. 10a-10d;

FIG. 12 depicts an exploded view of the exemplary ducted-fan depicted in FIGS. 10a-10d.

Figure 1:
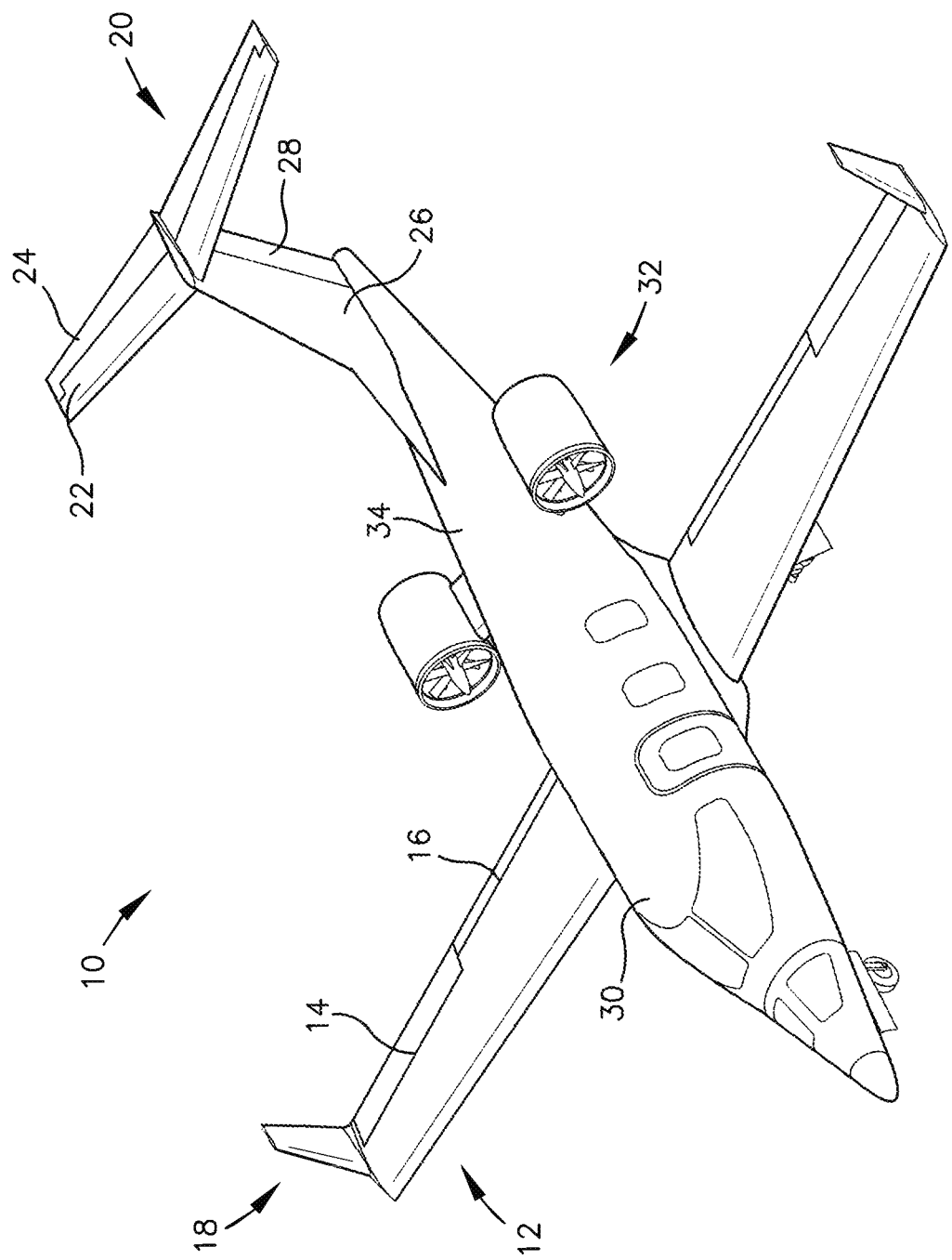
FIG. 1 depicts a top perspective view of an exemplary embodiment of the aircraft.

The drawing figures do not limit the invention to the specific embodiments disclosed and described herein. The drawings are not necessarily to scale, emphasis instead being placed upon clearly illustrating the principles of the invention.

DETAILED DESCRIPTION

Configurations and components of the aircraft presented may be broken into categories for simplicity. A general overview of the main features and expectations of the aircraft are presented first, followed by exemplary embodiments of configurations of the aircraft. A more detailed description of the interior/exterior propulsion system is given next that focuses on the components of the propulsion system housed within the fuselage then components of the propulsion system housed on the exterior of the fuselage. An exemplary flight plan following an embodiment of the aircraft through an exemplary flight is presented and followed by alternative embodiments of configurations and operations of the aircraft. The following description of embodiments of the aircraft are exemplary and any components or features in embodiments of the aircraft may be combined, omitted, or added.

General

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Exemplary Aircraft

Before discussing components, the general structure, exemplary embodiments, and exemplary configurations may be generally discussed. Exemplary aircraft embodiments and exemplary configurations are provided below.

In embodiments of the aircraft, a general aviation passenger aircraft may be flown by one or more crew members. The aircraft may be a fixed wing T-tail aircraft with a reciprocating V8 aluminum block liquid cooled engine. The engine may power twin ducted fuselage mounted counter rotating fans. The engine may be operated at a constant RPM while twin turbochargers maintain a constant pressure. For example, a sea level based manifold pressure through turbonormalization may be maintained. The twin counter rotating ducted-fans may alter thrust through an engine operating speed to fan speed ratio provided by a continuously variable transmission. The aircraft may be neutrally stable and small adjustments to thrust may provide for stability and straight and level flight. The aircraft may utilize maximum engine RPM during the take-off phase and reduced RPM during the climb phase. The engine RPM may be reduced to a constant cruise phase RPM where the thrust is controlled by adjusting fan blade pitch while the fan blades maintain a near constant 0.97 Mach tip speed or fan-Mach ratio. During the cruise phase the propulsion system efficiency may reduce fuel requirements, for example, to as low as nine gallons per hour.

The noise of the aircraft may also propagate at lower levels than aircraft in the market today. The noise levels may be reduced in several ways. The ducts act as mufflers for the fans reducing the propeller noise. A muffler and an exhaust silencer may be added to the exhaust system to reduce the engine noise. The reduced noise may make the aircraft one of the quietest general aviation aircrafts available enabling the aircraft to utilize any airport at any time regardless of noise restrictions.

The high efficiency and the use of modern techniques in designing engines also makes the aircraft environmentally friendly. Due to climate change and air pollution levels, national air quality standards are expected to become stricter in the future. The aircraft may use standard modern vehicle engines that already meet strict environmental automobile regulations. The engine may be a standard model that is already in production or a new design based on the requirements of the aircraft. The fuel efficiency provided by the aircraft may also help meet regulations by reducing the amount of exhaust emitted and fuel burned. Many parts of the aircraft work together to reduce emissions and reduce fuel burn.

The aircraft may also provide a level of convenience. By using a gasoline engine, the fuel is readily available and inexpensive to have available at airports. As with the convenience of readily available fuel, the aircraft operates at extremely low noise levels. Unlike typical general aviation aircraft, the aircraft provides noise insulation for both the engine and the propeller allowing it to take off and land at any airport at any time. The combination of low noise and gasoline powered engine make the aircraft capable of utilizing any airport night or day.

The aircraft may be scalable from a two seat to a fifty-seat aircraft or may be able to accommodate any number of passengers and crew. The aircraft may be a general aviation, military, and/or commercial aircraft. The aircraft may be a cruise missile or an amphibious vehicle such as a torpedo or amphibious airplane. The aircraft may have one, two, or more ducted-fans in a pusher or puller configuration that may be adjusted along three orthogonal axis or swivel to provide any angle of thrust vectoring. The aircraft may be configured to take off and land using a traditional runway or may be vertical takeoff and landing capable. The aircraft may be configured with a T-tail, V-tail, fuselage mounted tail, boom mounted tail, or any style tail providing longitudinal and lateral direction stability and control or no tail. The aircraft may be a blended body, flying wing, or have any shape of fuselage that may be necessary. The wings may be straight, elliptical, swept, or any other configuration that may be efficient for the type of flight regime of the aircraft. The wing span, aspect ratio, airfoil, or any other feature of the aircraft may be designed or chosen based on the expected operation of the aircraft.

Though exemplary embodiments of the invention may focus on a general aviation aircraft, in embodiments, the aircraft may be military, commercial, amphibious, autonomous, combat, high endurance, or may be used as a cruise missile or any other type of air vehicle. The aircraft may be adaptable to any type of situation or purpose that may be useful.

The aircraft may be used for general aviation. The aircraft is quiet and maintains the goal of access any airport that may service general aviation aircraft at any time of day or night. The operational fuel is gasoline so it may be readily available. Because of the efficiency, the aircraft is inexpensive to operate and the automation relieves the pilot of complex duties. The aircraft may also be commercially used in transportation of goods or people. The aircraft may not be limited in seating and may be up-scaled to carry more passengers.

The aircraft may have performance characteristics that outperform typical general aviation aircraft on the market today. The aircraft may have a service ceiling of more than 29,000 feet, with a pressurized and heated cabin, fly at more than 325 knots, and consume less than 10 gallons of fuel per hour. The aircraft may provide levels of convenience that are not typical of other general aviation aircraft such as a gasoline powered engine and noise insulation that enables the aircraft to utilize any airport at any time regardless of noise restrictions.

In embodiments, the aircraft may provide efficient flight by employing neutral stability. The components of the aircraft may be placed such that the aircraft center of gravity corresponds with the aircraft center of lift making the aircraft neutrally stable. A neutrally stable aircraft has the benefit of being extremely responsive to inputs. The aircraft may be exceptionally responsive to the pilot input as well as the autopilot input. Small changes in thrust, elevator deflection, or aileron deflection from the autopilot or pilot may be used to maintain straight and level flight. Small inputs from the pilot may make the aircraft feel more like a fighter style aircraft than a general aviation or a commercial style aircraft that are longitudinally stable aircraft. In a longitudinally stable aircraft the center of lift is located aft of the center of mass making the aircraft nose heavy. The elevator must be engaged causing the aircraft to fly straight and level. The aircraft being in a state that allows the aircraft to maintain straight and level flight is generally referred to as "trimmed". Deflecting control surfaces such as the ailerons, rudder, or elevator to maintain straight and level flight, or trim, may result a drag component generally referred to as "trim drag". The aircraft, being neutrally stable, may not have longitudinal trim drag since the elevator may not need to be deflected for straight and level flight, in general, causing the aircraft to be more efficient.

The aircraft may fly through five flight phases: take-off, climb, cruise, descent, and landing, three of which are outlined here. The aircraft may take off at full engine RPM and optimal fan RPM and torque loading. The aircraft may then enter the climb phase where the engine RPM is reduced and the fan and torque loading are optimized for an optimal climb rate. During the cruise phase the engine speed RPM may be reduced to between 2,100 RPM and 2,800 RPM at 29,000 feet and 325 knots true airspeed. This may be achieved by controlling the engine RPM. By controlling the engine RPM a near constant RPM may be maintained. A gear reduction system may be employed to maintain an optimal RPM range for the propeller fans and an optimal torque loading for the engine. This may all be achieved by setting the transmission gear ratio between the engine and the fan. Since the aircraft is balanced for neutral stability the drag is minimized and the airplane may achieve a fuel efficiency of below nine gallons per hour. Though an engine speed of 2,100 RPM and 2,800 RPM is used in the above exemplary embodiment, the engine speed RPM may be any values between 2,200 and 5,500 RPM. The engine RPM may vary based on atmospheric conditions, engine age or use, altitude, aircraft weight, or any other factors that may change the thrust required to maintain straight and level flight.

FIG. 1 presents a front perspective view of an exemplary embodiment of the aircraft 10. The wings 12, as depicted in FIG. 1, may be fixed and may provide stability and reliability for the aircraft 10. The fixed wing 12 configuration has been proven to be reliable and is standard on many general aviation, military, and commercial aircraft. Though the wings 12 in the embodiment of FIG. 1 may be fixed, the wings 12 may be swept, straight, elliptical, or any other shape that may provide the best option for efficiency, maneuverability, range, endurance, or function that may be necessary for operation in embodiments of the aircraft 10. The wings 12 may also be forward swept, rotate for storage on an aircraft carrier, or sweep into position allowing for high speed flight.

One or more ailerons 14 as depicted in the exemplary embodiment in FIG. 1, may be configured to be attached to the wing 12 at the trailing edge and towards the wing 12 tip. This may result in quick response of the aircraft 10 with little input from a pilot or an autopilot. The ailerons 14, when deflected, may create a moment about an axis spanning the length of the fuselage thus inciting a rolling action for the aircraft 10.

Continuing with the embodiment depicted in FIG. 1, the wing 12 may also be configured with a set of flaps 16. The set of flaps 16, when deflected, may provide the aircraft 10 with additional lift and drag during different flight phases. The flaps may create extra necessary lift on takeoff and may provide extra drag, slowing the aircraft during descent and landing.

As air flows over the wing 12, high pressure air below the wing 12 may rotate around the wing tip creating vortices that increase drag. This drag is commonly called induced drag. The winglets 18 may help prevent the vortices from reaching the top of the wing 12, or reduce the vortices, thereby reducing drag. The winglets 18 may reduce the induced drag of the aircraft 10 thus improving the efficiency.

Turbulators (not shown) may also be added to a surface of the wing 12. The turbulators may increase the fuel efficiency of the aircraft 10 by reducing drag. As air flows over the wing 12, the airflow remains laminar until it reaches a part of the wing 12 where the airflow separates from the fixed wing 12 surface. At this point a low-pressure air pocket between the airflow and the wing increases drag. A turbulator may be added to a surface of the fixed wing 12 surface to cause high energy turbulent air to remain attached to the fixed wing 12. The turbulent air may remain attached to the wing 12 surface longer than laminar air thereby negating, or delaying the low-pressure pocket that increases drag. Through this method, a component of drag associated with the flow of air over the wing 12 of the aircraft 10 may be reduced.

The aircraft 10 may be configured with a tail 20 as depicted in the exemplary embodiment of FIG. 1. The tail 20 may be configured with a horizontal stabilizer 22 and attached elevator 24 that may be configured to rotate about a transverse axis to provide the aircraft with a pitching moment. The tail 20 may also be configured with a vertical stabilizer 26 and attached rudder 28. As the aircraft 10 may be configured with aft fuselage 30 mounted ducted-fans 32, the tail 20 is both necessary and provides benefits. The horizontal stabilizer 22 may be in a configuration that avoids fan wash aft of the ducted-fans 32. Raising the horizontal stabilizer 22 to the top of the vertical stabilizer 26 allows free flowing air to contact the stability and control surfaces such as the elevator 24 and the rudder 28, providing more predictable stability and control of the aircraft 10. The tail 20 configured in a T design also raises the horizontal stabilizer 22 out of the downwash created by the fixed wing 12. The vortices created by the wing 12 may come into contact with the horizontal stabilizer 22 decreasing efficiency. Downward rotating air meeting the horizontal stabilizer 22 and elevator 24 may decrease the angle of attack of the horizontal stabilizer 22 reducing the lift of the horizontal stabilizer 22 and reducing the effectiveness of the elevator 24. The higher the horizontal stabilizer 22, the lower the risk of downwash from the fixed wing 12 or turbulent air from the ducted-fans 32 degrading the performance.

In embodiments, the tail 20 may be a T-tail, V-tail, cruciform tail, twin-tail, fuselage 30 mounted horizontal stabilizer 22, or any other tail configuration that may be useful or necessary for the operation of the aircraft 10. For example, the aircraft 10 may be a cargo plane that requires a large fuselage volume requiring a blended body design and a twin tail configuration. In embodiments, the aircraft 10 may have no tail and be a blended body or flying wing configuration with spoilers as control surfaces. The blended body or flying wing configuration may also utilize differential thrust and thrust vectoring for additional control.

Figure 5:
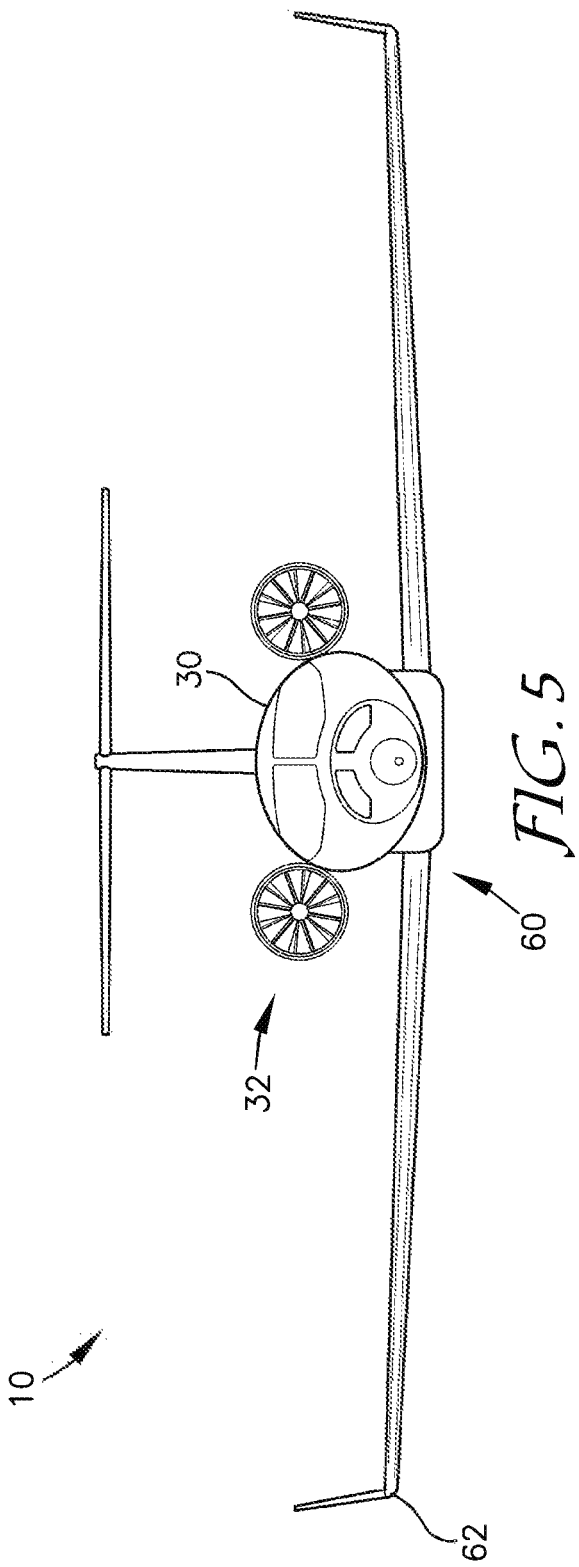
FIG. 5 depicts a front view of the exemplary embodiment of the aircraft of FIG. 1.
Figure 6:
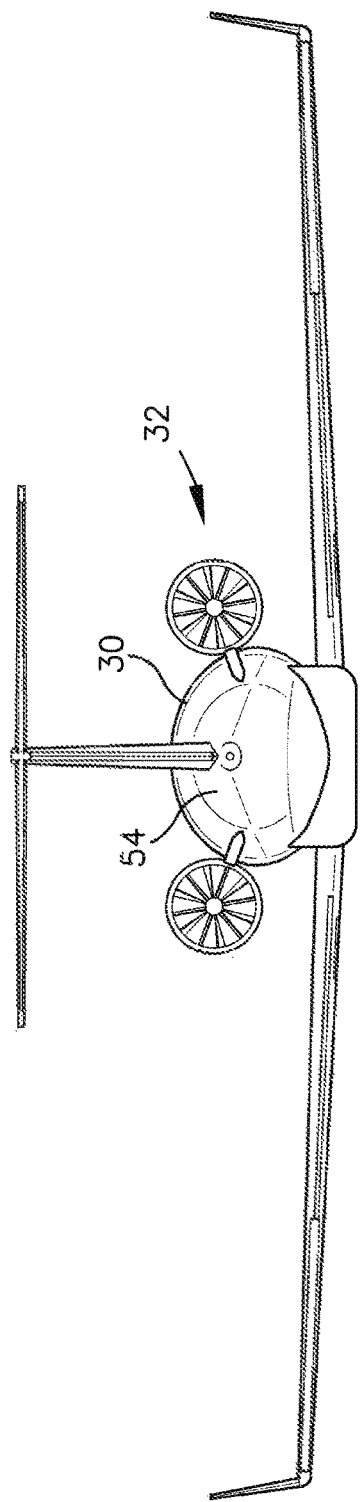
FIG. 6 depicts a rear view of the exemplary embodiment of the aircraft of FIG. 1.

In embodiments, the fuselage 30 may have a circular or oval shaped cross-section about a vertical axis relative to the aircraft as shown in FIGS. 5 and 6. The fuselage 30 shape may be defined by the function or operation of the aircraft 10. For example, The aircraft 10 may be a general aviation aircraft and seat up to five passengers, or may be a commercial regional aircraft and seat fifty or more passengers. The fuselage 30 carrying five passengers may be shorter and have a smaller diameter than the fuselage 30 of the fifty-passenger aircraft. The aircraft 10 may also provide restrooms and luggage bins for the passengers. The fuselage 30 may also provide access panels 34 that may access the engine and other components. The fuselage 30 cross-section may be any shape that may fit the passengers and luggage comfortably while maintaining an aerodynamic shape and structural soundness.

In embodiments, the aircraft 10 may contain sensors or extra fuel and therefore may have a fuselage cross-section providing necessary functionality. For example, the aircraft 10 may be an autonomous military or a high altitude long endurance aircraft and require a long streamline configuration. Any operational possibility may have a direct impact on fuselage 30 design.

In embodiments, the ducted-fan 32 may be mounted to the fuselage 30 aft of the wing 12. The aircraft 10 is configured to be a general aviation aircraft that is more fuel efficient than other general aviation aircraft. Fuselage 30 mounted ducted-fans 32 may provide many benefits to the aircraft 10 in this regard as well as providing convenience and passenger comfort.

A major drawback of wing-mounted engines is the noise. Wing-mounted engines project an excessive amount of noise into the passenger cabin. The noise from the engine can be heard anywhere in the cabin but most prominently adjacent and aft of the engine. Turning to an exemplary embodiment depicted in FIG. 2, the aircraft 10 may have an engine mounted in the fuselage 30 behind the cabin 38. The engine may be as quiet as any modern vehicle with the same or similar noise insulation. The ducted-fan 32 may be mounted aft of the cabin 38 resulting in the noise generated by the ducted-fans 32 to be projected aft and behind the cabin 38. This may result in very little noise in the cabin 38 providing for increased passenger comfort over general aviation aircraft available today.

Another drawback to wing mounted engines is thrust moment. A thrust moment may be created by the engine center of thrust being offset from the center of mass, or rotation point, of the aircraft 10. For example, an engine mounted below the wing of an aircraft may produce a center of thrust be below the center of gravity of the aircraft resulting in a positive pitching moment. The positive pitching moment may be overcome by deflecting the elevator downward from the trim position. This may result in more drag. In embodiments of the aircraft 10, the ducted-fans 32 may be configured in line with, or slightly above, the center of gravity of the aircraft 10. When the thrust is changed, the aircraft 10 may remain in trim so no action is needed by the elevator 24. Further, since the aircraft 10 may be neutrally stable, the elevator 24 trim condition may also be neutral. The aircraft 10 may remain trimmed while not creating any additional drag. Under optimal conditions the aircraft 10 thrust may be equivalent to the aircraft 10 drag. On typical aircraft, the thrust of the aircraft must be greater than the drag and the aircraft is balanced by deflecting the elevator. The aircraft 10 may be neutrally stable and balanced such that the thrust and drag may be equivalent.

Small changes in flight condition may be made by increasing or decreasing the thrust of the aircraft 10. Small altitude adjustments may be made by increasing the ducted-fans 32 rotation speed or increasing the fan blade pitch. These adjustments may cause the aircraft 10 to slowly gain altitude while maintaining near optimal conditions. The engine may remain at or near constant RPM while the transmission adjusts the RPM of the fan slightly to gain airspeed. The fan RPM may also remain constant at near 0.97 Mach tip speed, or fan-Mach ratio, allowing the fan to move as much air as possible without creating a shock in the duct that may cause structural damage and loss of efficiency. The pitch of the fan blades adjusted to control the airflow and thrust providing airspeed changes of the aircraft 10. The higher airspeed may cause the aircraft 10 to increase altitude with little to no control surface deflection, thus creating minimal to no additional drag. Using this technique, the aircraft 10 may gain or lose altitude while maintaining near optimal conditions and adding little to no drag.

A possible drawback to fuselage mounted engines may be the weight and thrust. The weight of a large engine mounted on the fuselage creates a large moment force that must be supported by large heavy structure. Additionally, the thrust of the engine creates a bending moment nearly perpendicular to the weight that must be overcome by a large heavy structure. Typically, only small aircraft have fuselage mounted engines because of the additional weight has greater associated cost than the benefits. In embodiments, the aircraft 10 reduces the drawbacks by housing the engine within the fuselage 30 to reduce the weight that must be supported by the fan mounts on the exterior of the fuselage 30. The aircraft 10 engine is housed within the fuselage 30 and only the duct, fans, and associated gears and structure are mounted outside the fuselage 30. This creates great weight savings in the structure required to mount the ducted-fans 32. The weight savings means that the aircraft 10 configuration may be up-scaled to larger commercial aircraft that currently may only use wing mounted engines.

Another drawback to wing mounted engines is the potential to capture foreign object debris (FOD) from the runway. Wing mounted engines are close to the runway on takeoff and landing. Any material on the runway has a chance of being sucked into the engine. This causes damage to the engine and accounts for millions of dollars of maintenance every year. The fuselage mounted ducted-fans 32 of embodiments of the aircraft 10 engine decrease the chance of capturing FOD. Not only is the engine further from the runway but it is protected by the wings 12. This greatly reduces the cost of maintenance for the aircraft 10.

The aircraft 10 maintenance cost may further be reduced by the configuration of the aircraft 10. Providing access panels 34 to the engine and transmission compartments 36 combined with the transmission location above the engine, maintenance costs on the aircraft 10 may be reduced. By reducing the time necessary to service the vehicle the labor hours and cost may be reduced. Access panels 34 may also be located under or above the engine and on the ducted-fans 32 under and over the fans; anywhere that may be most convenient for mechanics.

Figure 2:
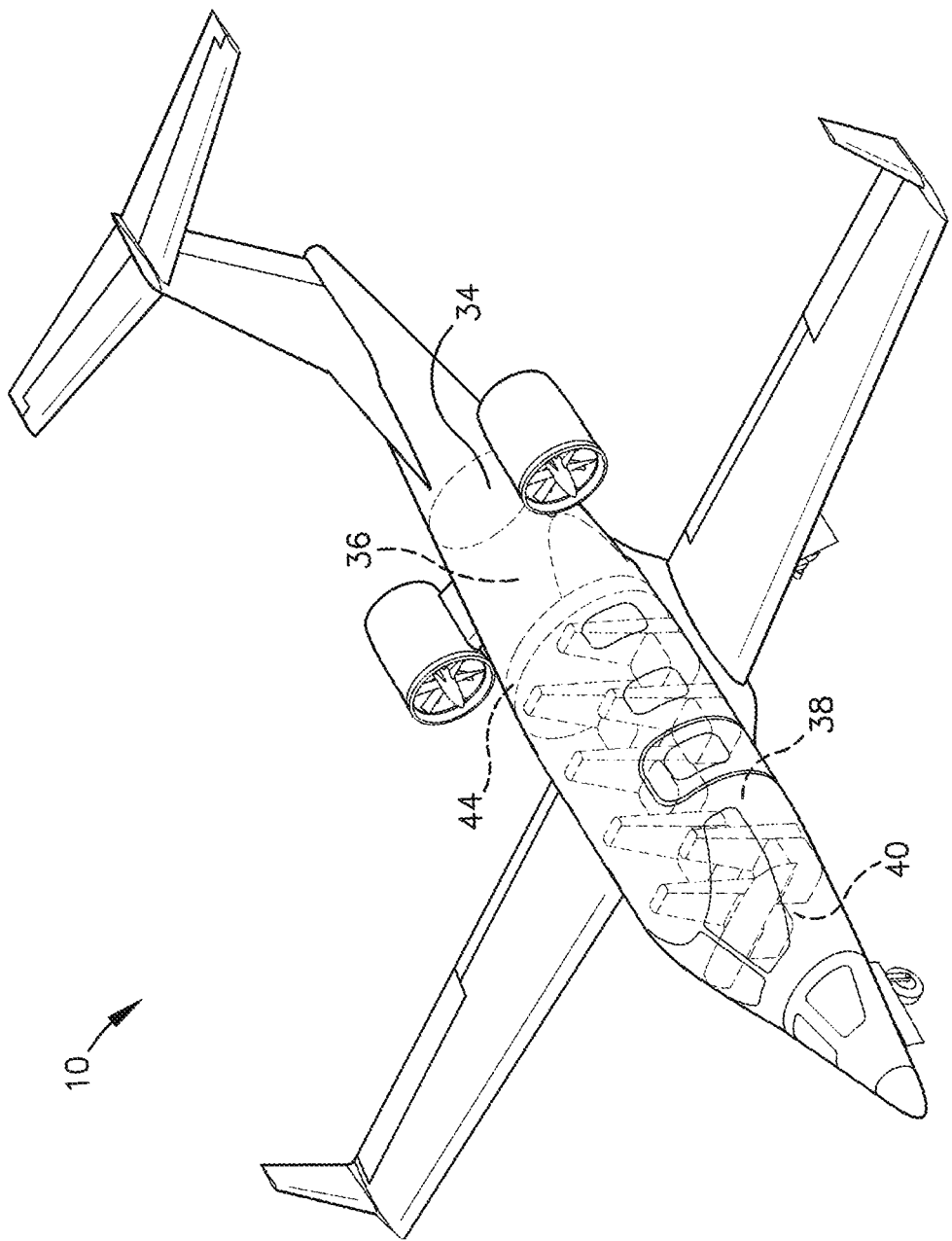
FIG. 2 depicts a top perspective view of the interior of the exemplary embodiment of the aircraft of FIG. 1.

Continuing with FIG. 2 depicting a front perspective view of the interior of the aircraft 10, the engine compartment 36 is visible. The engine compartment may house the reciprocating engine that powers the ducted-fans 32. The reciprocating engine and transmission may be housed in the engine compartment 36 and may be accessible through the access panels 34.

The engine compartment 36 may be separated from the passengers in the cabin 38 by an insulated firewall 44. The insulated firewall 44 may protect the passengers from any engine malfunctions, heat, and noise. The passengers, located in the cabin 38, may have a similar experience as riding in a modern automobile since the engine may be a modern reciprocating engine separated by the firewall 44 as in modern automobiles.

The cabin 38, as depicted in the exemplary embodiment, may seat five passengers and have one door for entry and exit. The cabin 38 may contain luggage compartments or designated luggage areas. The cabin 38 may also contain a restroom. In embodiments, the cabin 38 may seat more or fewer passengers. The cabin 38 may also have more restrooms and exits as required by the Federal Aviation Administration (FAA) based on the maximum occupancy of the cabin 38.

The cockpit 40 may accommodate one, two, or more, crew members and be open to the cabin 38. The cockpit 40 may also have a wall separating the cockpit 40 and the cabin. In embodiments, the wall may be for security purposes as mandated by the FAA depending on the function and operation of the aircraft 10.

Though the embodiment depicted in FIGS. 1 and 2 may be a general aviation aircraft seating five passengers, the aircraft 10 may be scalable up to fifty plus passengers while providing the same or similar benefits as described above. The aircraft 10 may also be a commercial or military aircraft.

Figure 3:
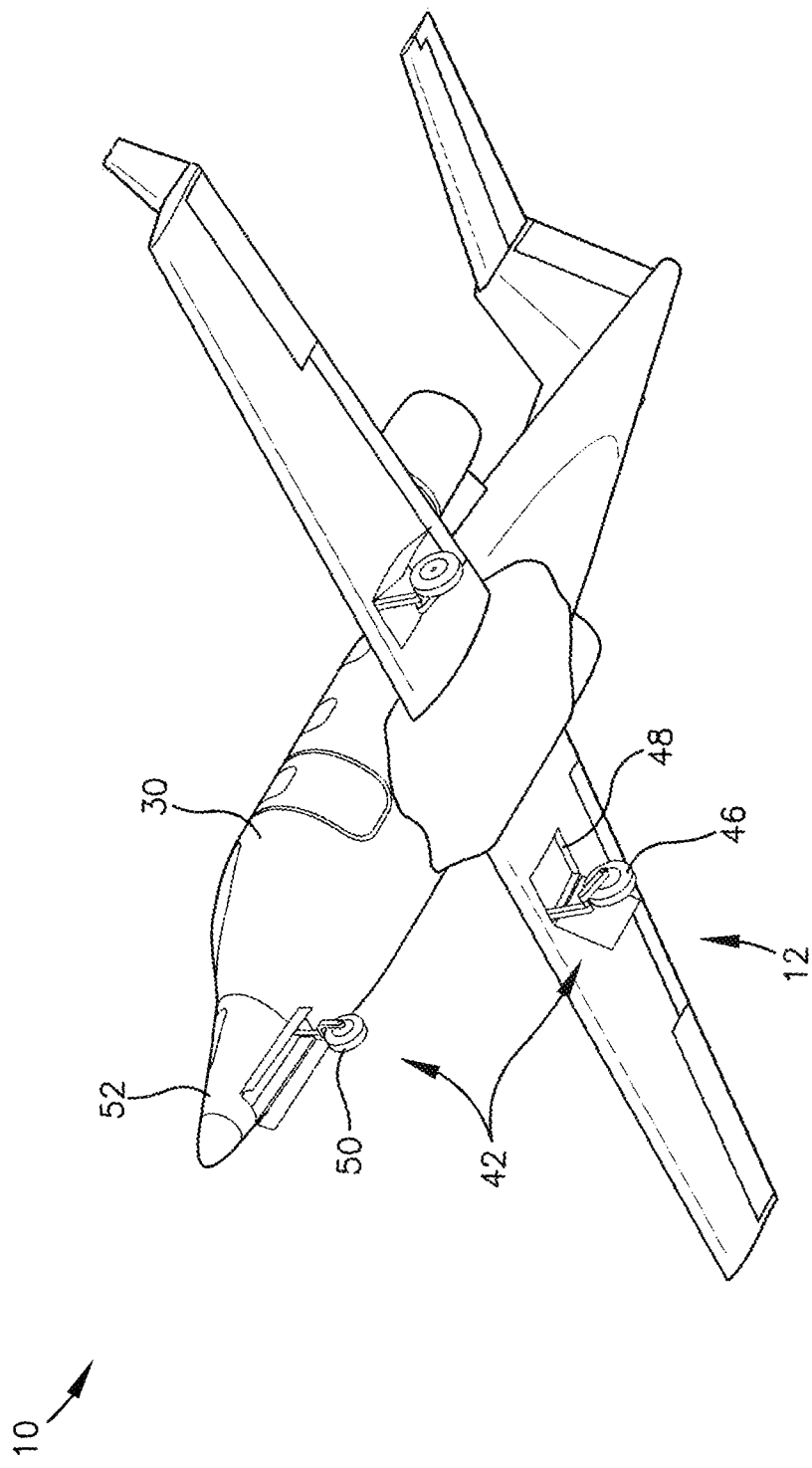
FIG. 3 depicts a bottom perspective view of the exemplary embodiment of the aircraft of FIG. 1.

FIG. 3 presents a bottom perspective view of an exemplary embodiment of the aircraft 10. The aircraft 10 may have landing gear 42. The landing gear 42 may be tricycle or conventional. As depicted in FIG. 3 the aircraft 10 is configured with tricycle style landing gear. The main gear 46 extends from the main gear compartment 48 from below the wing 12. The front gear 50 may extend from a compartment located in the nose of the aircraft 52. For example, the landing gear 42 may be stationary and may not retract into the aircraft 10 or the landing gear 42 may retract. Retracting the landing gear 42 decreases in flight drag but also may increase weight. Since the landing gear 42 on the aircraft 10 is relatively short, due to the fuselage 30 mounted ducted-fans 32, the compartments housing the landing gear and the motors and/or hydraulic or electrical systems may be relatively small and light weight. This may save weight and allow for the aircraft 10 to maintain retracted landing gear 42 at low costs for weight and high drag savings.

Landing gear on aircraft may be configured to support the weight of the aircraft at high speeds. The longer the landing gear the more robust it must be and thus the heavier it is. Continuing with the embodiment depicted in FIG. 3, the fuselage 30 mounted ducted-fans 32 allow the wings 12 to have minimal landing clearance for the aircraft 10 without the need to provide engine clearance. The landing gear 42 may be long enough to provide Federal Aviation Administration (FAA) mandated clearance for the fuselage 30. The low profile of the aircraft 10 may minimize the length of the landing gear 42 and significantly reduces the overall weight of the aircraft 10. This configuration may be advantageous over typical aircraft with wing mounted engines, as the landing gear 42 for the aircraft 10 may be much shorter.

Figure 4:
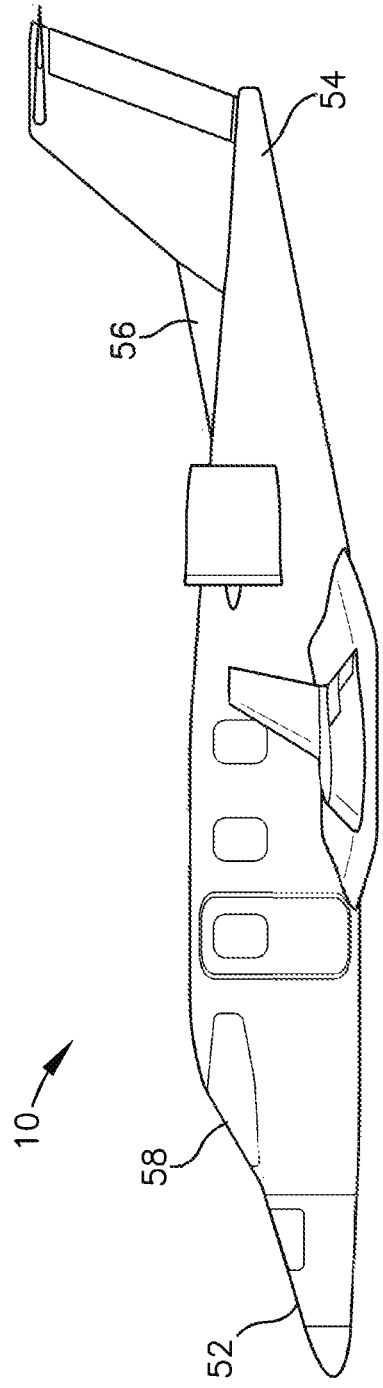
FIG. 4 depicts a side view of the exemplary embodiment of the aircraft of FIG. 1.

Turning now to an embodiment depicted in FIG. 4, the aft fuselage section 54 may be tapered for aerodynamics and to allow rotation on takeoff and landing. The short landing gear described above provides for a low-profile aircraft. However, with tricycle style landing gear, the aircraft must rotate for takeoff and landing. The aft fuselage section 54 may taper upwards on the bottom portion to allow room for the rotation. The rotation creates an angle of attack into the wind giving the aircraft the lift needed for take-off and landing. The tail 20 of the aircraft 10 may also be mounted at the aft fuselage section 54. In order to decease the height of the tail 20, the aircraft 10 may be configured with a dorsal fin 56. The dorsal fin 56 may add lateral and directional stability. The aircraft 10 may also be configured with a high canopy 58 and a downward sloped nose section 52. This may provide the pilot with runway visibility on landing.

FIG. 5 depicts a front view of an exemplary embodiment of the aircraft 10. In FIG. 5, the ducted-fans 32 have clear line of site with oncoming airflow. This configuration may aid in efficiency by introducing undisturbed air into the inlet of the ducted-fans 32. The wing 12 may also be set at an angle to the horizontal. The wing 12 is configured to be angled upward from root 60 to tip 62. This is known as dihedral. Dihedral stabilizes the spiral mode of the aircraft 10. When a wind blows across the aircraft 10 the aircraft 10 may then be flying at an angle to the oncoming wind called sideslip. As the sideslip impacts the dihedral of the wing 12, the dihedral provides the wing 12 side of the oncoming wind with a higher angle of attack thus generating a restorative force. In embodiments, the aircraft 10 may be configured with straight wings or anhedral wings depending on the operation and functionality of the aircraft 10.

Turning now to the embodiment depicted in FIG. 6, it can be seen that the aircraft 10 fuselage 30 cross-section reduces in area towards the aft fuselage section 54. The configuration presented in FIG. 6 may aid in keeping the laminar airflow attached to the fuselage 30. If the flow becomes detached a low-pressure area around the fuselage 30 forms, dramatically increasing drag. It can be seen that the aircraft 10 is configured to allow the airflow from the ducted-fans 32 to have a clear path out of the ducted-fans 32. This further aids in reduced drag and efficiency.

Figure 7:
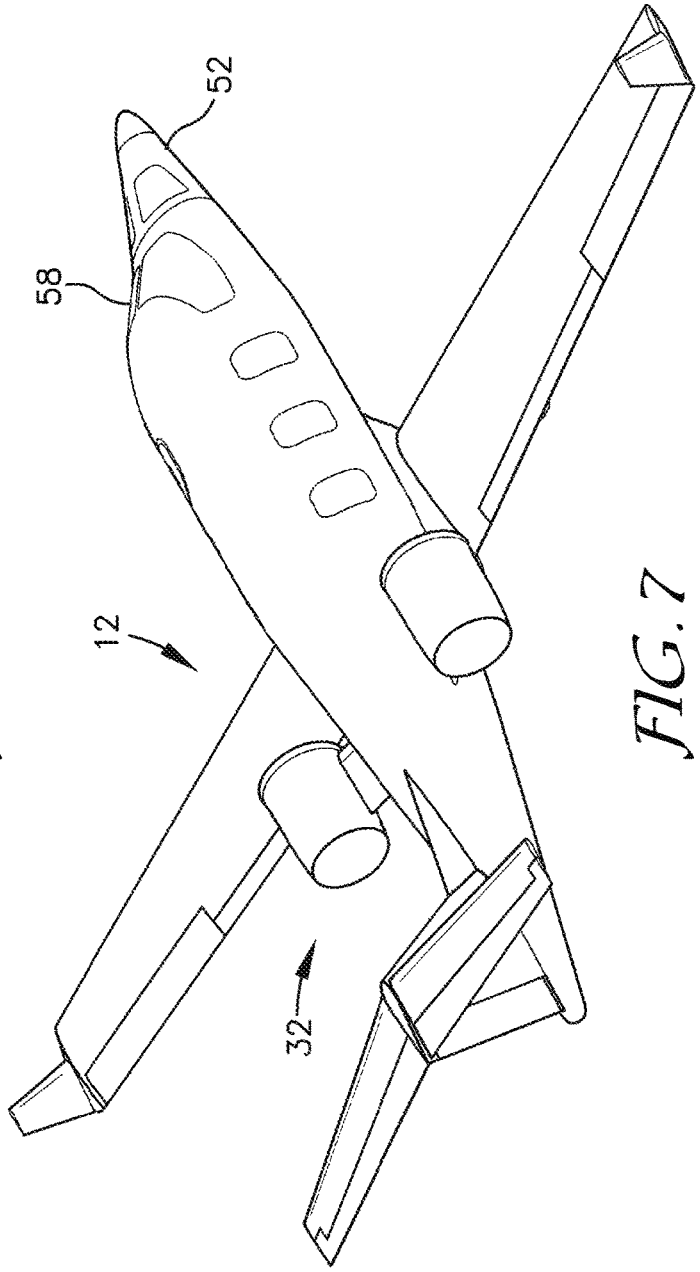
FIG. 7 depicts a rear perspective view of the exemplary embodiment of the aircraft of FIG. 1.

Turning to an embodiment depicted in FIG. 7, it can also be seen that the ducted-fans 32 a protected by the wings 12 from Foreign Object Debris (FOD) that may be on the runway and may be disturbed and sucked into the ducted-fans 32 during takeoff and landing. From this perspective view, it can be seen that the angled nose section 52 provides line of sight to the pilot peering out of the window 58.

Propulsion System (Interior)

The propulsion system of the aircraft 10 may be broken into two categories; interior to the fuselage 30 and exterior the fuselage 30. This may be thought of as an interior/exterior propulsion system. One exemplary goal is to allow only the components that are necessary to be on the exterior such as the ducted-fans 32 and components necessary to operate the ducted-fans 32. Within the fuselage may be the engine 64 and components necessary to operate the engine. This purpose of this may be to save weight and provide higher efficiency as described below.

Figure 8:
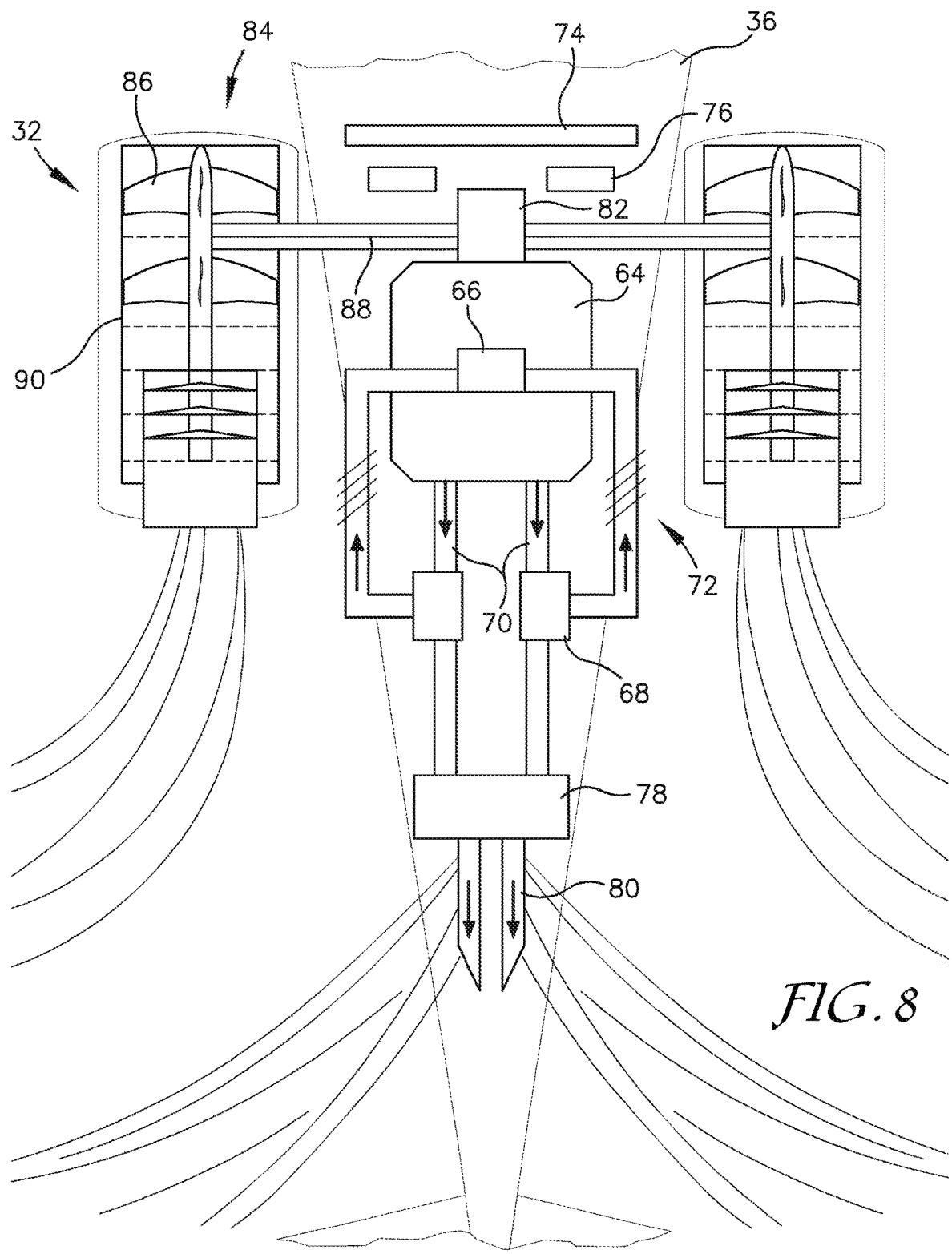
FIG. 8 depicts a top view of an exemplary embodiment of the propulsion system of the aircraft.

Turning now to an exemplary embodiment of the aircraft 10 propulsion system depicted in FIG. 8. The propulsion system may be configured with fuselage 30 interior components such as an engine 64, fuel injectors 66, turbochargers 68, an exhaust system 70, intercoolers 72, a radiator 74, cooling fans 76, a muffler 78, silencer 80, and a transmission 82. The interior propulsion components may also be partially housed outside the fuselage 30 and are described in detail below.

The aircraft 10 as depicted in the exemplary embodiment of FIG. 8, may be configured with engine 64 which may be a V8 engine. The engine 64 may be mounted in the fuselage 30 aft of the cabin 38 in the engine compartment 36 and placed in a location relative the other aircraft components to maintain a neutral stability. The engine 64 may be a gasoline burning reciprocating engine. Based on thrust testing and an optimal design of the fan blades, fan speed, and duct, the most efficient engine operating RPM may fall in a range of 2,100 to 2,800. Though, in embodiments, the most efficient operating range is 2,100 to 2,800 the most efficient operating range may be adjusted as other engines, fan blades, or any other differences in the aircraft 10 may require different operating speeds and power. For example, the operating range may be anywhere between 1,800 RPM and 5,500 RPM based on the atmospheric conditions, aircraft 10 weight, cruise speed, headwind, or any other variables that may alter the operation of the aircraft 10.

The aircraft 10 may comprise a modern efficient light weight engine 64. The engine 64 may be a high-performance aluminum or aluminum alloy engine 64 typical of high performance automobiles. The engine 64 may be liquid cooled and run a lean fuel to air mixture. The engine 64 may be efficient and may be light weight as compared to other general aviation aircraft engines today.

Figure 14:
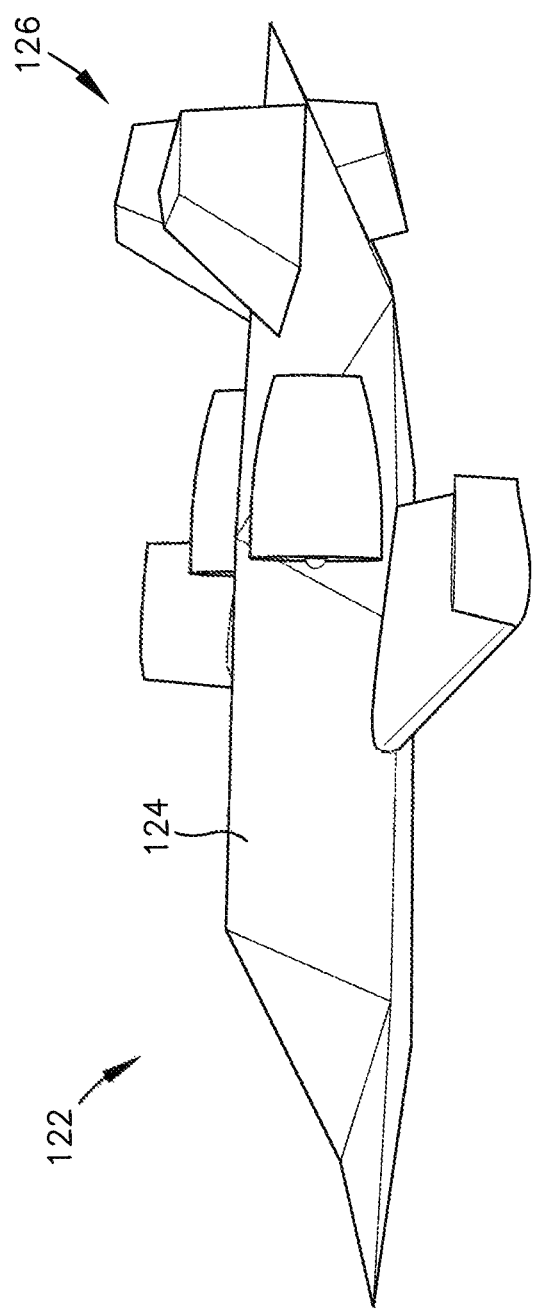
FIG. 14 depicts an exemplary stealth style aircraft of embodiments of the invention.

Though, in embodiments, the engine 64 is a V8, the engine may have two, three, four, six, twelve, or any other number cylinders. The engine 64 may also be a straight configuration having all cylinders in line rather than the V configuration. The engine 64 may be rotary or electric and may be powered by an external source such as batteries, solar power, or wind. In embodiments, the maximum horsepower provided by the engine 64 may be 600, but the engine 64 volume and number of cylinders may be changed to meet operational requirements. In some embodiments, the aircraft 10 may be a commercial, cargo aircraft and the engine 64 may be a V12 and produce greater than 600 horsepower. In other embodiments, the aircraft 10 may be military and have similar power requirements to the commercial version therefore employing the same engine 64 as shown in FIG. 14. In embodiments, the aircraft 10 may be a single seat aircraft of high endurance and weight and efficiency may be of concern in which case the engine 64 may be a four cylinder.

The aircraft 10 engine 64 may be mounted in a double-cradle configuration. The engine may be attached both below and above to provide more contact points and reduce vibration. The double-cradle mounting configuration may provide more contact points between the engine 64 and the aircraft 10 frame than typical configurations. The double-cradle mounting configuration along with the near constant RPM may reduce vibration and provide passengers with a smooth ride. In embodiments, the engine 64 may be mounted using a double-cradle configuration, other configurations such as cradle or any other technique that may support the engine 64 while conserving weight and providing a smooth ride may be used. The engine 64 may be mounted with vibration dampers to further provide the passengers with a smooth ride.

In embodiments and as depicted in FIG. 8, the aircraft 10 engine 64 fuel efficiency may be increased over standard carburetor options by utilizing fuel injection. The fuel injection system 66 may inject fuel directly into each engine cylinder. In carburetor systems, the air and fuel is mixed in the carburetor then forced into the cylinder. In the carburetor systems, the fuel air mixture may not be delivered to each cylinder evenly causing the engine 64 to run sub optimally. By injecting the fuel into the cylinders directly, the fuel entering the engine 64 may be precisely controlled and the engine 64 may run at higher efficiency. The fuel injection system 66 type may be single-point or throttle body, port or multi-point, sequential, direct, or any other method that may inject a precise amount of fuel into the engine.

The aircraft 10 fuel injection system 66 may have other benefits. The fuel injection system 66 may be controlled automatically. As the aircraft 10 changes altitude, the density of the air changes thus changing the fuel to air ratio entering the engine 64 cylinders. Typically, as the air density changes, a pilot must change the fuel mixture to accommodate the changing air density. In the aircraft 10, this may be done automatically. The aircraft 10 may be equipped with sensors such as barometers, static and dynamic pressure sensors, thermometers, spectra sensors, or any other sensors useful in detecting atmospheric conditions. These sensors may detect pressure, temperature, water vapor, or any other atmospheric condition that may be useful for monitoring condition, calculating other parameters, or controlling the aircraft 10 or any functions of the aircraft 10. The sensors may detect the atmospheric conditions and air density may be determined based on the measurements. The amount of fuel injected may be such that an optimal air to fuel ratio is achieved inside the engine 64 cylinder thus providing a highly efficient engine 64 performance for the density altitude of the aircraft 10. This process may allow the engine 64 to operate at a near constant RPM within the optimal performance range of the engine 64.

In embodiments, turbochargers 68 may be used to keep the air entering the engine 64 at a sea level type pressure, known as turbonormalization, therefore allowing the fuel injection to remain constant. Under these conditions the air and fuel mixture may be monitored and adjusted for small deviations to maintain optimality. However, the fuel may be injected constantly and only the airflow into the engine may be altered to maintain turbonormalization.

In some embodiments, the aircraft 10 may use a carburetor instead of fuel injection. The carburetor may be less expensive and less complex as compared to fuel injection. Since the airflow may be controlled to maintain turbonormalization a carburetor may be used and the flow not adjusted. This may simplify the operations of the pilot while maintaining an inexpensive carbureted aircraft 10 option.

Continuing with the embodiment depicted in FIG. 8, the aircraft 10 propulsion system may employ turbochargers 68 to increase the power and efficiency. The aircraft 10 may utilize turbochargers 68 for all phases of flight and for any RPM range. It may be especially useful to have efficient turbocharger 68 utilization during take-off, climb, and cruise. The flight phases during which turbochargers 68 are to be utilized require different power output and possibly different engine RPM. This may complicate the use of turbochargers 68 that may be designed to be efficient at specific RPM ranges. Utilizing variable geometry and scroll turbochargers 68 may be useful for providing efficient power at all stages necessary by supplying regenerative power efficiently at multiple RPM stages. In this regard, the aircraft 10 may be equipped with one, two, or more turbochargers which may be single, twin, twin-scroll, variable geometry, variable twin-scroll, or electric. The multiple turbocharger 68 options may be configured in parallel, sequentially, and in any combination that may optimize thrust and efficiency at the desired RPM range for each phase of flight.

In some embodiments, the turbochargers 68 may provide the aircraft 10 engine 64 with sea-level-type conditions. This is known as turbonormalization. As the aircraft 10 increases altitude the air becomes less dense. The turbochargers 68 may provide a sea-level air condition to the engine 64 enabling the engine 64 to operate under known, constant, and optimal conditions. During this operation, the fuel injection may remain constant. The fuel injection may slightly, automatically, be adjusted to control straight and level flight or when the engine 64 is under varying loads.

Continuing the embodiment as depicted in FIG. 8, the exhaust system 70 may cycle the exhaust from the engine through turbochargers 68, intercoolers 72, emissions devices such as a catalytic converter (not shown), to different aircraft 10 components for de-icing, to the environmental control system, and through mufflers and silencers to finally be expelled from the aircraft. Exhaust system 70 may cycle the exhaust gasses to many places that may be beneficial for the aircraft 10.

The exhaust system 70 may comprise a liquid cooled exhaust manifold that may be configured to be in or near the engine 64. This allows the exhaust manifold to be near the turbochargers 68 and the turbochargers 68 to be located near the engine 64 intake thus reducing weight. A liquid cooled exhaust manifold cools the catalytic converter allowing higher engine temperatures and leaner fuel to air ratios thus enabling the engine 64 to have more power for a given RPM and reduces emissions.

Most general aviation reciprocating engine aircraft today are air cooled. This method of cooling the engine uses a rich fuel to air mixture to maintain cool exhaust temperature. The rich fuel to air mixture, high fuel to air ratio, keeps the engine from overheating and cools the catalytic converter. The catalytic converter converts the exhaust gas to a less toxic form prior to expelling into the atmosphere and is mandated by the federal government to reduce pollution for automobile engines. The catalytic converter may run at an optimum temperature and may stop working and need replacing if run too hot. A rich mixture cools the catalytic converter by cooling the exhaust that is introduced into the catalytic converter.

In the embodiment depicted in FIG. 8, the aircraft 10 may utilize a liquid cooled exhaust to run on lean fuel to air ratio mixtures. A rich mixture may not be the most efficient for running the engine 64. A lean mixture, a higher ratio of air to fuel than a rich mixture, may allow the engine 64 to run more efficiently by providing more power for a given RPM and fuel intake. One of the main problems with running the engine 64 lean is that it may overheat or the exhaust may burn up the catalytic converter. Running a lean mixture increases the combustion temperature and increases the exhaust temperature. Cooling the exhaust air prior to entering the turbocharger, using liquid cooling, may allow for more cooler air to enter the catalytic converter while maintaining high temperature lean conditions in the engine 64 combustion chamber. Since the catalytic converter temperature is controlled, the engine 64 may run a leaner mixture thus causing more power per RPM and higher efficiency. The aircraft 10 engine 64 may utilize this technique to provide more power for the near constant cruise RPM.

A liquid cooled exhaust system 70 may also conserve the life of the engine 64 and reduce maintenance costs. Cooling the catalytic converter and introducing a lean mixture into the engine 64 may allow the engine 64 to be heated to optimal running temperature more quickly. When the engine 64 is running at optimal running temperature the engine is not only efficient but protected. During cold starts the engine 64 may heat up quickly minimizing the run time of the engine 64 at cold temperatures thus reducing wear, maintenance, and part replacement costs.

Heating the engine 64 quickly also allows the cabin 38 to be heated quickly. Since the environmental control system uses the heat from the exhaust or from the engine 64, the cabin 38 may be heated and pressurized quickly. This allows for less time to be spent on the tarmac reducing fuel costs and increasing convenience for passengers.

A liquid cooled exhaust system 70 also may reduce emissions. Since the exhaust system 70 is cooled before reaching the catalytic converter the catalytic converter may run at optimal temperature. This may increase the conversion efficiency of the exhaust system 70 thus producing a less toxic output.

Continuing with the embodiment depicted in FIG. 8, air from the outlet of the turbochargers 68 may be used in an environmental control system (not shown). The air from the turbochargers 68 may be at a high temperature and pressure, ideal for use in heating and pressurizing the cabin 38. The air may be run through the environmental control system where the air is controlled to a specific predetermined temperature and pressure. The air may then be introduced into the cabin 38. The heated and pressurized air in the cabin 38 may allow the occupants of the aircraft 10 to fly at high altitudes that may be more efficient by reducing drag. The aircraft 10 may cruise at altitudes as great or greater than 29,000 feet. At these altitudes, the outside air temperatures may be −30 to −50 degrees centigrade. The current general aviation heating systems are not typically equipped to handle such low temperatures. The aircraft 10 may be equipped with a system of radiant force air heat using engine coolant similar to typical automobile heating systems. Bleed air from the turbochargers 68 may flow through the environmental control system and pressurize cabin 38 and heat the cabin 38 to temperatures as high or higher than fifty degrees.

In embodiments, the turbochargers 68 may compress the air at high altitudes making the air suitable for the engine 64 to operate with high efficiency. The turbocharged air may be conditioned separately from the environmental control system to enter the engine 64 at a specific temperature and pressure. The turbocharged air may be run through intercoolers 72. The intercoolers 72 may be air-to-air or air-to-water, bar and plate or tube and fin style intercoolers to lower the temperature and increase the density of the air. The lower temperature may prevent the engine 64 from overheating or combusting too soon in the cylinder and may introduce a specific air density for the engine 64 to mix the fuel providing an optimal fuel to air ratio. The intercoolers 72 may also provide the catalytic converter with conditioned air for an optimal running temperature. The fuel to air ratio may be managed by controlling the fuel as described above, controlling the turbocharged air temperature and pressure, or a combination of both.

The embodiment depicted in FIG. 8 may be turbonormalized. The charged air may be controlled using a combination of the turbochargers 68 and the intercoolers 72 to maintain sea level manifold pressure at altitudes up to and above 29,000 feet. The fuel to air ratio may not need to be controlled since the air intake and the engine 64 RPM may be held nearly constant. The fuel to air ratio may also be controlled for slight variations to maintain optimal conditions. The fuel supplied to the engine 64 may be constant. The air pressure and temperature supplied to the engine 64 may be constant, and the engine 64 may then turn at a nearly constant RPM within the most efficient and optimal range of the engine 64. This may increase the performance of the engine 64 over those typically found in general aviation today.

In embodiments, exhaust air or charged air from the turbochargers 68 may also be used for de-icing without loss to the engine 64 performance. The charged air may be sent to the wing 12 and control surfaces to maintain a temperature high enough to prevent ice from forming. The air may be sent intermittently or constantly based on the environmental conditions. The charged air may be sent through an intercooler 72 or sent directly with no conditioning.

In embodiments, the engine 64 may be liquid cooled. As depicted in FIG. 8, in embodiments the engine 64 may be liquid cooled. The radiator 74 may reduce the temperature of a liquid coolant after exiting the cooling stage of the engine 64. The liquid coolant may be used to cool the engine 64, intercoolers 72, turbochargers 68, or any other propulsion component that may be cooled to operate at a high efficiency.

Cooling fans 76 may suck air through the radiator to cool the fluid after it has cycled through the engine 64 components. The air at altitude may be as low as 50 degrees below-zero Centigrade. The atmosphere may provide a very efficient heat sink at this altitude. The cooling fans 76 may be controlled to run at lower speeds or not at all at high altitudes and at higher rates near sea level where the atmospheric conditions provide a higher temperature. The cooling fans 76 may be controlled to run automatically when necessary thereby conserving energy while not needed.

Continuing with the exemplary embodiment depicted in FIG. 8, the exhaust system 70 may also comprise a muffler 78 and an exhaust silencer 80. The aircraft 10 may be one of the quietest aircraft available. The noise of the engine 64 may be insulated in several ways. The engine 64 may be provided in a noise insulated fuselage 30, the fans may be ducted, and the exhaust system 70 may comprise a muffler 78 and exhaust silencer 80. The muffler 70 and exhaust silencer 80 may route sound waves to cancel out large amounts of noise from the engine 64. Any modern noise reduction techniques may be used and the aircraft 10 may be as quite as any automobile on the road today. Any style muffler 70 or exhaust silencer 80 may be used in any combination to reduce the aircraft noise while maintaining engine performance.

In embodiments, the aircraft 10 transmission 82 includes gear reduction and torque conversion. The gear reduction system may be universal or continuous; each with their own set of benefits. The aircraft 10 engine 64 may run at a near constant RPM during the cruise phase of flight providing near constant thrust from the fan 84. To provide different levels of thrust as needed by the aircraft 10 throughout different flight phases and for maintaining straight and level flight in the cruise phase, the fan blades 86 may change pitch or RPM. The fan 84 also may not rotate at the same rate is the engine 64 crank shaft. The fan 84 rotation may be optimized for performance and may rotate at an RPM different than that of the engine 64 crank shaft. This may be done by two methods. A planetary gear reduction system may be used in which the fan 84 RPM is set during different phases or under different conditions and the fan blade 86 pitch is then used to define the thrust generated. Alternatively, a continuous, or infinite, variable transmission may be used that may change the rotation rate of the fan based on conditions to any rate allowable by the transmission 82.

In the embodiment depicted in FIG. 8, the transmission 82 may be a continuously variable transmission. The continuously variable transmission may be pulley based, toroidal, or hydrostatic. In the exemplary embodiment depicted in FIG. 8, the transmission 82 may be a pulley based continuously variable transmission. The transmission 82 may comprise a variable diameter input pulley and an output pulley. The input pulley and the output pulley may be connected by a rubber or metal belt. In embodiments, there may be more than two pulleys and more than one belt. The distance between the pulleys may be varied controlling the RPM ratio between the input and the output. The engine 64 crankshaft may provide the input and the output may drive a differential drive shaft 88 that translates the energy to the fan 84. The variable RPM ratio may allow the aircraft 10 engine 64 to run at a near constant ideal RPM while the fan 84 runs at a different near ideal RPM. This maximizes the efficiency of the propulsion system. In this configuration, the fan blade 86 pitch may also be varied to control torque loading and thrust to maintain straight and level flight during the cruise phase.

In embodiments, the output of the transmission 82 may be connected to the drive shaft 88. The drive shaft 88 may be a differential drive shaft translating the power of the engine 64 to the ducted-fans 32. The drive shaft 82 may have a set of gears transferring the transmission 82 output from one rotating shaft to two shafts rotating in opposite directions and transferring the rotation to the ducted-fans 32. The drive shafts 88 transferring the rotation to the ducted-fans 32 may enter the duct 90 and connect to the fan 84 through a stator housed within the ducted-fan 32.

Generally, for wing mounted engines, since the engines are mounted below the center of gravity of the aircraft the thrust causes a positive pitching moment. Control surface deflections must be made to compensate for the positive pitching moment. The elevator may be deflected to counteract the positive pitching moment induced by the thrust. Deflecting the elevator may result in an increased drag component thus decreasing the overall efficiency of the aircraft and increasing fuel consumption.

Figure 9:
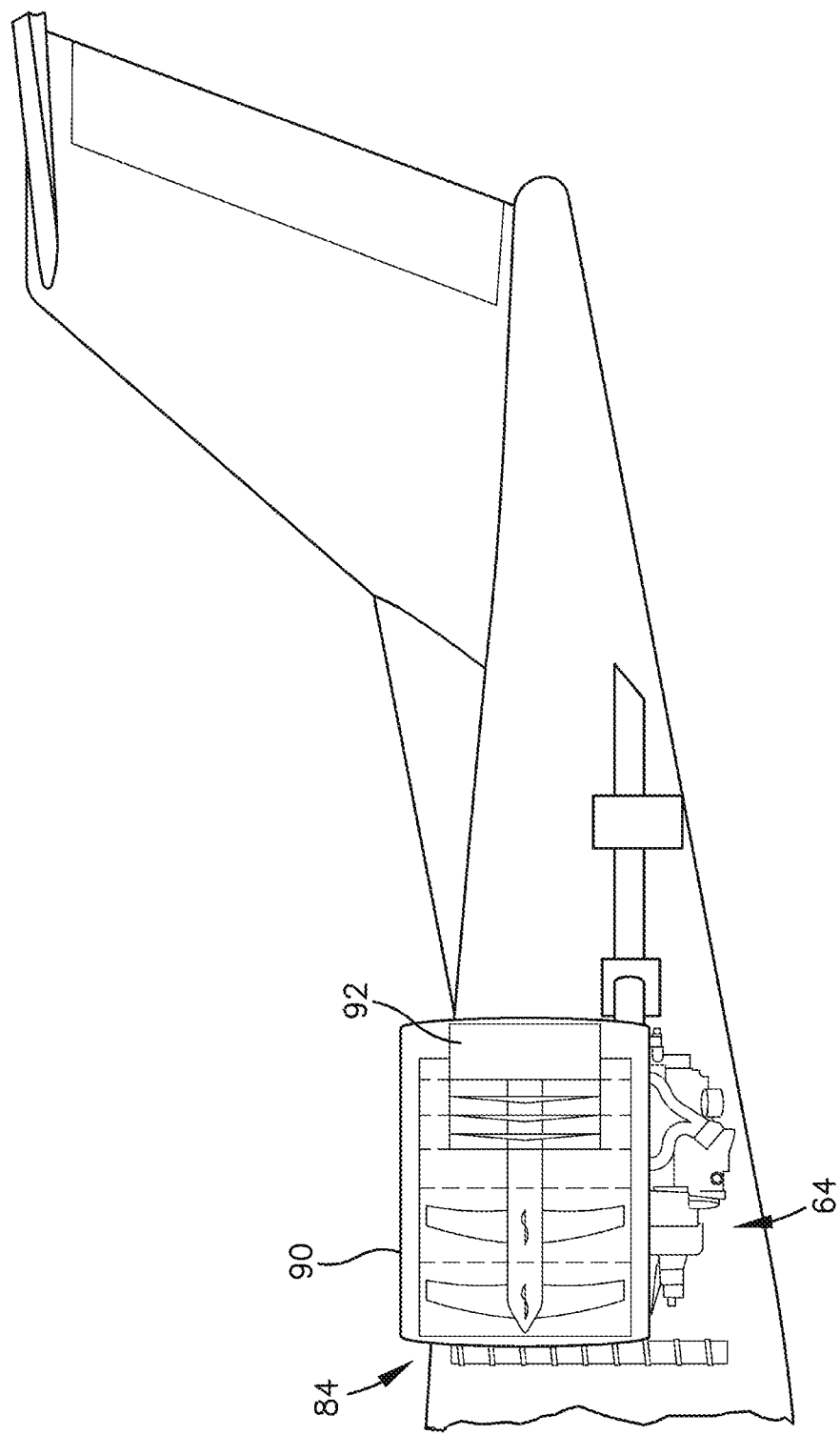
FIG. 9 depicts a side view of the exemplary embodiment of the propulsion system of the aircraft depicted in FIG. 8.

In the embodiment of the aircraft 10 depicted in FIG. 9, the transmission 82 (not shown) may be located above the engine 64. The location of the transmission 82 above the engine 64 may enable the ducted-fans 32 to be raised above the height of the engine 64. This may provide a thrust vector above the longitudinal axis of the aircraft 10. The thrust vector may then be placed in a position that works with the neutral stability of the aircraft 10 to provide a balancing force creating the most efficient configuration for the aircraft 10. The performance efficiency provided by this configuration outmatches the performance of typical aircraft today.

The placement of the transmission may provide greater access to the transmission and the engine. Access panels may be placed on the exterior of the aircraft such that the engine and transmission may be easily accessible for maintenance, repair, or replacement. The access panels may be located on the upper and lower sides of the fuselage. The access panels may allow maintenance crews to easily access parts that readily need inspection, repair, or replacement.

Propulsion System (Exterior)

In embodiments, components of the propulsion system may be housed within the fuselage 30 as described above. The engine 64 and component necessary for engine 64 operation may be housed within the fuselage 30 to decrease the weight that is mounted on the exterior of the fuselage 30. However, some components such as the ducted-fans 32 may be housed on the exterior of the fuselage 30. This may provide many benefits as described below.

In embodiments, as depicted in FIG. 9, podded fans 92 may be configured to be housed inside the duct 90 aft of the fan 84. The podded fans 92 may provide a secondary thrust element that outweighs the added drag component. The podded fans 92 may be a ducted-fan within the ducted-fan 32 and may be configured in any way as related to the ducted-fan 32 as stated above or in any description below.

In embodiments, multiple ducts may be used. The configuration or operation of the aircraft may necessitate multiple ducted-fans 32. For example, one ducted-fan 32 may be necessary and may be configured to be attached to the fuselage 30, wing 12, or any other part of the aircraft 10. Two or more ducted-fans 32 may be necessary and may be configured to be attached to the fuselage 30, the wings 32, or any other part of the aircraft 10. Three ducted-fans 32 may be attached to the fuselage 30, or two on the wings 12, and one on the fuselage 30. Any number of ducted-fans may be attached to any portion of the aircraft 10.

In embodiments as depicted in FIG. 10, the ducted-fan 32 may be mounted to the fuselage 30 structurally through a strut 94 that houses the drive shaft 88. The strut 94 as seen in FIGS. 10*a* and 10*b*, may comprise an aerodynamic shell with structure for supporting the ducted-fans 32 and additional space for housing the drive shaft 88. The strut 94 may be aerodynamically designed to be low drag while maintaining the strength to support the ducted-fans 32. The strut 94 may also be capable of supporting the maximum torque and thrust loads imparted by the ducted-fans 32. The strut 94 may also be configured to reduce wear over time and last the life cycle of the aircraft 10. The strut 94 may be made of metal, composite, or any material that may provide light weight and be capable of performing the necessary functions. Though the strut 94 houses the drive shaft 88, in the embodiment, the strut 94 may be separate. In embodiments, the strut 94 may support the ducted-fans 32 independently of the drive shaft 88 and the drive shaft 88 may connect to the ducted-fan 32 through a separate aerodynamic housing.

As depicted in the exemplary embodiment in FIG. 10, the drive shaft 88 may enter the duct 90 through the stator 96 allowing the duct 90 to be unchanged and have no unnecessary drag or flow disruption from the drive shaft 88. The drive shaft 88 may be configured to run through the strut 94, into the stator 96, and finally connecting to the hub 98. The cross-section of the stator 96 in which the drive shaft 88 is housed may be airfoil shaped and may force circulating air from the fan 84 to flow nearly parallel to the direction of flight. The drive shaft 88 may freely rotate within the stator 96 while not affecting the stator 96 operation.

The drive shaft 88 may be connected to the fan 84 within the fan hub 96. The fan hub 96 may comprise a differential translating the rotation of the drive shaft 88 to the fan blades 86. The fan 84 and drive shaft 88 may rotate at the same RPM or may be different. The differential may provide a gear reduction that changes the RPM from the drive shaft 88 to the fan 84. This may be done to maintain efficiency for the fan blades 86 while running the engine 64 at an optimal RPM.

The fan hub 98 may house the drive shaft 88 and differential within an aerodynamic shell. The aerodynamic shell may have a symmetric cross section and may be elongated to house other components. The aerodynamic shell may be any shape and any length that provides the least drag and performs the necessary operation of the aircraft 10.

The drive shaft 88 may drive the fan 84. The fan 84 may comprise fan blades 86 with airfoil cross sections that rotate, pushing air aft, and creating thrust. The fan 84 may have one, two, three or any number of fan blades 86 that provides the most efficient operation. The fan 84 may be made of a material and constructed in a fashion that may support the appropriate bending and stress loads that may be imparted on the fan blades 86. The operation of the fan 84 and atmospheric conditions may provide added constraints to the fan blades 86 that may be overcome by materials, construction, and manufacturing. For example, the atmosphere at 29,000 cruise altitude may be −50 Centigrade. The fan blades 86 may spin at a high rate causing the fan blades 86 to heat to higher temperatures. The distance between the duct 90 and the fan blades 86 must be extremely small and maintained in order to maintain high efficiency and a lock on the airflow. A material that may withstand the stress of the fan blades 86 in operation as well as maintain a low thermal expansion may be used.

There may be one, two, three, or more fans for the operation of the aircraft. In embodiments, two fans 84 may be optimal. The fans 84 may be designed to counter rotate, or rotate in opposite directions. The counter rotating fans 84 may eliminate P-factor. P-factor is a force that is generated by two main components both as a result of angle of attack. When an aircraft flies at a positive angle of attack relative to the airflow, the airflow has an upward component relative to the aircraft. The propeller side turning downward then has a greater angle of attack into the wind than does the propeller turning upward. The greater the angle of attack the greater the force of lift caused by the airfoil shaped propeller. Therefore, the center of thrust generated by the propeller will move slightly to the side of the propeller that is generating a greater force. This is compounded by a velocity component. The propeller side moving downward into the wind has a slightly higher velocity into the oncoming wind also as a result of the angle of attack. The propeller side receding away, or turning upward, from the extra wind component provided by the angle of attack has a lower speed into the wind. This increases the offset of the center of thrust to the downward turning side of the propeller and thus creates a yawing moment on the aircraft. In order to counter the effects of P-factor, the rudder must be deflected to generate a restoring force opposing the yawing moment generated by the P-factor force. Due to P-factor, the induced yawing moment, and the rudder deflection drag is increased for the duration of the flight. Placing two counter rotating fans 32, as disposed, in embodiments, on the aircraft 10, on opposing sides of the aircraft 10 center body cancels the P-factor force and allows the aircraft 10 to fly without deflecting the rudder 28 thus reducing drag.

Continuing with the embodiment depicted in FIG. 10, the ducted-fan 32 may be a system with all components working together. In order to gain the most efficient system the parts may be designed in conjunction rather than individually. For example, the fan blades 86 may be configured to move a specific amount of air to produce a specific amount of thrust for a particular geometry for the hub 98. If the duct 90 is designed separately, the airflow may change, impacting the fan blade 86 performance and the expected thrust is not achieved thus making the design less efficient. To gain the most efficient system the duct 90, fan blades 86, and hub 98 geometries may be variable parameters while maintaining constraints to optimize the geometry as a whole.

The duct 90 may be optimized for use in conjunction with the aircraft 10 and the fan 84. An optimization procedure may be performed to define the geometry of the duct 90, fan blades 86, and hub 98 shape. For example, a simulation may be performed for determining the most optimal geometry for the duct 90, fan blades 86, and hub 98. The performance measurements may be duct 90 drag, hub 98 drag, and thrust. The fixed parameters for the fan blade 86 may be chord, profile, thickness, sweep, number, and for the other components; duct 90 radius, hub 98 radius, RPM, airspeed, and air density. The parameters to be optimized may be duct 90 shape, hub 98 shape, and fan blade 86 angle. The duct 90, hub 98, and fan blades 86 may be designed and optimized for any flight phase or all flight phases generally.

Figure 10B:
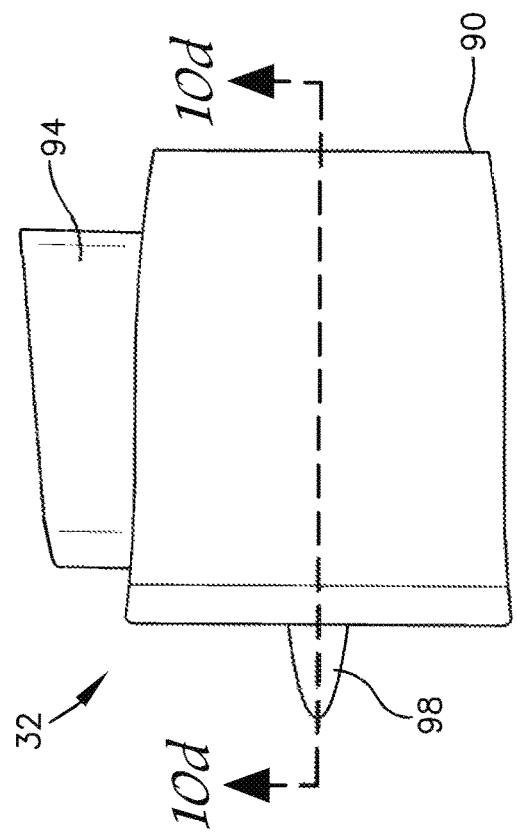
FIGS. 10a-10d depict an exemplary ducted-fan of embodiments of the aircraft.
Figure 10D:
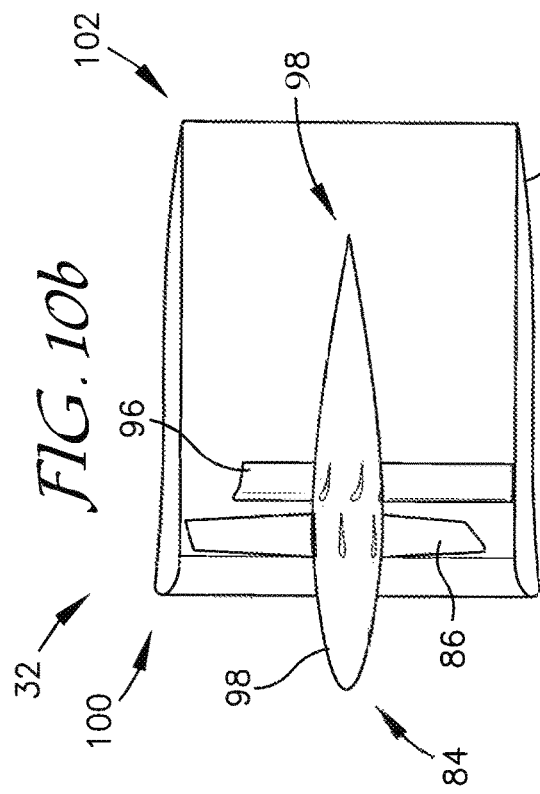
Figure 10A:
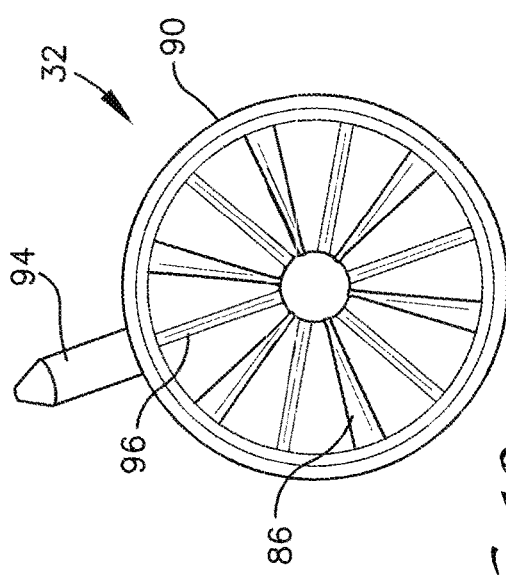
Figure 10C:
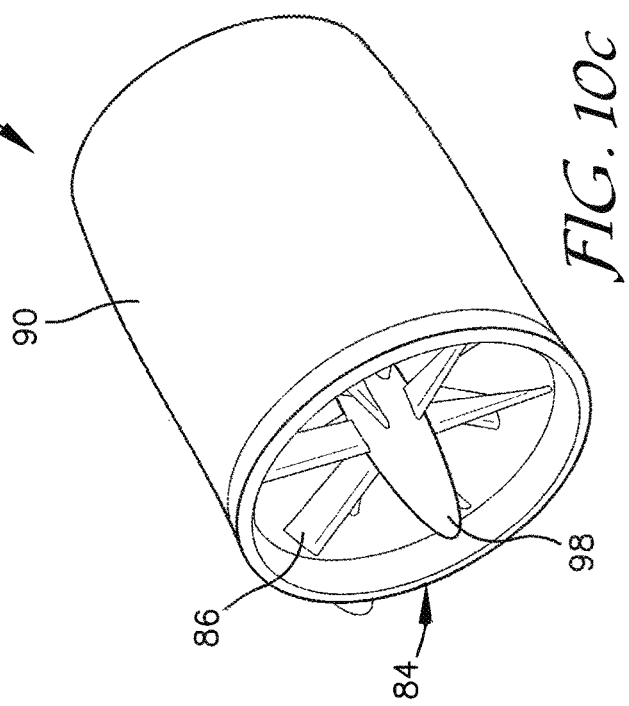

Continuing with the embodiment depicted in FIG. 10, the duct 90 may be configured with a slight outward projection at the inlet 100 as best seen in FIG. 10*d*. The inlet 100 may be configured to capture slightly more air than a straight duct. The inlet 100 may converge slightly to the main portion of the duct 90 slightly compressing the captured air. As the fan 84 rotates the inlet air is forced aft generating thrust and moving the aircraft 10 forward. Though the inlet 100 in the embodiment depicted in FIG. 10*d* is projected outward to the oncoming airflow, the inlet 100 may be straight or projected inward. The inlet 100 may be configured in any way that is beneficial for embodiments of the aircraft 10. For example, a fifty passenger commercial aircraft 10 may have a large fan 84 that requires a large amount of thrust and a large amount of ram air. Based on the optimized design, the inlet 100 may be projected outward to capture more air making the large fan 84 more efficient. In an alternative exemplary embodiment, the aircraft 10 may be a small two passenger aircraft that has a small ducted-fan 32. Based on the optimized design of the ducted-fan 32, the most efficient performance for this smaller fan may have a straight inlet 100 and an inlet 100 projected outward may degrade the performance. The duct 90 inlet 100 may be configured in such a way that allows the fan 84 the best performance for the function of the aircraft 10.

The projected design of the inlet 100 may also keep airflow over the inlet laminar. At low speeds airflow over a straight inlet 100 may become turbulent and degrade the performance of the fan 84. Projecting the inlet 100 outward, as shown in FIG. 10*d*, may aid in keeping the airflow laminar thus introducing undisturbed air to the fan 84 and creating more efficient thrust.

The duct 90 geometry may be optimized for high thrust and low drag. While the duct 90 shape may change, minimum thickness and length constraints may be maintained in order to provide the strength and noise insulation necessary to meet the requirements of the aircraft 10. The minimum requirements for thickness and length may be based on the material used for the duct or may be based on the number of fans 84, stators 96, or the separation between the number of fans 84 and stators 92. For example, the duct 90 may house one fan 84 and no stators 96. Therefore, the one fan 84 may not produce a large pressure so the duct 90 may not need to be as thick as a multi-fan configuration. There may also be no stators 96 so the duct 90 may not need to be long for the purpose of housing multi-fans and stators 96. The optimization may result in a short duct 90 to house one fan 84 and a longer duct 90 to house multi-fans and stators 96. The design of the duct 90 is not independent of the fan 84 and the hub 98. In the embodiment depicted in FIG. 10 the aircraft 10 is equipped with a one fan 84 and one stator 96 set. In embodiments, as depicted in FIG. 8, the aircraft 10 may be configured with multiple fans 84.

Continuing with the embodiment depicted in FIG. 10, the outlet of the duct 90 may be configured for high efficiency. As well as the duct 90 being configured for optimal performance at the inlet 100 and the shape, the outlet 102 may have a major impact on the performance of the aircraft 10.

The outlet 100 of the duct 90 may be configured to decrease back pressure and may reduce drag. The outlet 90 as depicted has a smaller diameter than the inlet 98. This configuration may be most efficient for the aircraft 10 of this embodiment. In embodiments, the inlet 100 and the outlet 102 may be the same diameter or different. For example, the inlet 100 may be projected outward creating a greater diameter at the inlet 100 than the rest of the duct 90. Though the outlet 102 as depicted in FIG. 10d is straight, in order to increase efficiency, the outlet 102 may be camber inward. This may create a higher pressure at the back of the outlet decreasing the pressure gradient at the outlet 102 thus decreasing drag.

In embodiments, the outer shell of the hub 98 may be configured to reduce drag and allow the fan blades 86 to achieve maximum thrust. As depicted in the embodiment and best seen in FIG. 10d. The hub 98 may be symmetric and elongated. The hub 98 may be designed in conjunction with the fan blades 86 and the duct 90 to produce the most efficient thrust to drag ratio. The hub 98 geometry may also be influence by the number of fans 84, fan blades 86, and stators 96. In the exemplary embodiment depicted in FIG. 10, there is one fan 84 comprised of six fan blades 86. There are also six stators 96. The hub 98 may be elongated to carry all components and provide for an efficient aerodynamic profile. In embodiments, there may be counter rotating fans 84 within the same duct 90 as depicted in FIG. 8. The hub 96 may be comprised of two rotation portions counter rotating two sets of fans 84. There may be stators 96 between the two fans 84, aft of the two fans 84, or both. The hub 98 may house any differential gearing and drive shafts 88 that may be necessary to provide the functions described.

Turning now to an embodiment depicted in FIG. 11, the fan blades 86 may be configured with an airfoil 104, a specific number, and pitch to rotate at a particular RPM and provide a specific thrust for an embodiment of the aircraft 10. As depicted in FIG. 11, the fan 84 may be configured with six fan blades 86. The number of fan blades 86 may be chosen and other parameters such as chord, blade length, thickness, and pitch may be varied to provide the necessary thrust for takeoff and the necessary RPM to achieve maximum efficiency while the engine 64 maintains an optimum cruise RPM.

The geometry of the fan blades 86 may be determined by the amount of thrust and drag of the ducted-fan 32. The fan blades 86 may comprise airfoils 104 that provide the necessary thrust for efficient flight of the aircraft 10. In embodiments, the airfoil 104 may be configured to work with a given pitch, chord, and length to provide the most efficient thrust to drag ratio of the fan 84 configuration.

The chord length may be configured for the given airfoil 104 to increase the lift, or thrust, provided by the airfoil 104. As the chord length is increased the moment forces acting on the fan blade 86 may increase forcing a variable pitch geometry or a greater thickness to the airfoil 104. Increasing the thickness of the airfoil 104 may allow the fan blade 86 to resist the forces but may also increase the drag on the fan blade 86 thus increasing fuel consumption. The aircraft 10 may have a chord length configured to promote the best efficiency for the given conditions.

The chord length may be configured in conjunction with pitch, length, RPM, and airfoil 104 to maintain the most efficient flight during a given flight phase. The fan blade 86 pitch may be configured to provide the most efficient thrust at a particular angle but may also be variable. In embodiments, the pitch may be adjustable by the pilot or by an autopilot to vary the thrust. The pitch may be adjusted to control flight conditions such as altitude, speed, or aircraft 10 attitude. Changing the pitch of the fan blades 86 may cause the thrust to drag ratio to decrease if moved away from optimal. The fan blades 86 pitch may also be controlled to parallel with the airflow. In the event of a malfunction the pitch may be set to minimize drag thus allow air to flow freely through the duct with minimal interference.

An efficient method of increasing thrust of the fan blades 86 may be increasing the length of the fan blades 86. Generally, on an open propeller aircraft, this may be a good strategy and may be limited by torque and the efficiency of the propeller as the forces become greater toward the tip. In the ducted-fan 32, as the length of the fan blade 86 increases the diameter of the duct 90 increases. This may add weight and increase the drag component provided by the duct 90.

Continuing with the embodiment depicted in FIG. 11, the stators 96 may be configured with a stator airfoil 106. The stator airfoil and pitch angle may be designed such that the airflow off the spinning fan blades 86 is straightened to provide more thrust. For example, when the fan blades 86 rotate air is forced aft. The air that is forced aft is also given a component of velocity in the direction of rotation. This component of velocity does not provide thrust and is therefore inefficient. The stators 96 may angle the air such that the angular component may be straightened to provide thrust to the aircraft thus capturing the full thrust available.

Turning now to an embodiment depicted in FIG. 12, the fan blades 86 may be set such that the fan blade tip 108 is within a few millimeters of the duct 90 during optimal flight conditions. Setting the fan blade tip 108 close to the duct 90 reduces the amount of airflow that may pass between the fan blade tip 108 and the duct 90. As the airfoil moves through the air, the air tends to rotate around the fan blade tip 108 of the fan blade 86 from the headwind side to the downwind side. This process creates a drag component called induced drag. Induced drag from the fan blades 86 may be reduced by placing the fan blade tips 108 close to the duct 90 preventing the air from circulating around the fan blade tips 108. This may reduce the overall drag of the system and allow for more efficient propulsion system.

Placing the fan blade tips 108 close to the duct 90 may reduce drag, but may also increase thrust efficiency. The fan blades 86, at the fan blade tip 108, may be rotating at close to the speed of sound. At this speed, the air begins to act like a denser fluid. This may create a more efficient thrust since the air may not slide between the fan blade tip 108 and the duct 90 creating a higher percentage of lock and more efficient thrust.

Continuing with the embodiment depicted in FIG. 12, the duct 90 may also be designed for sound mitigation. The duct 90 may be primary noise insulator for the fan 84. Fans 84 spinning at high speeds produce noise that may cause the aircraft 10 to be grounded at certain airports and at certain times. The FAA regulates airport noise and, in residential areas, there may be time restrictions on aircraft that produce certain levels of noise. The aircraft 10 duct 90 may be designed to maintain noise levels below these requirements. A goal of the aircraft 10 may be to fly out of any airport at any time while maintaining noise levels below any requirements. The combination of the duct 90 with the engine 64 housed in the fuselage 30, and the muffler 78 and silencer 80 provides an unmatched level of noise mitigation and convenience to the passengers and crew.

Exemplary Flight Plan

For simplicity and to provide a general understanding of an exemplary use of an embodiment of the aircraft 10, an exemplary flight plan is described below.

Figure 13:
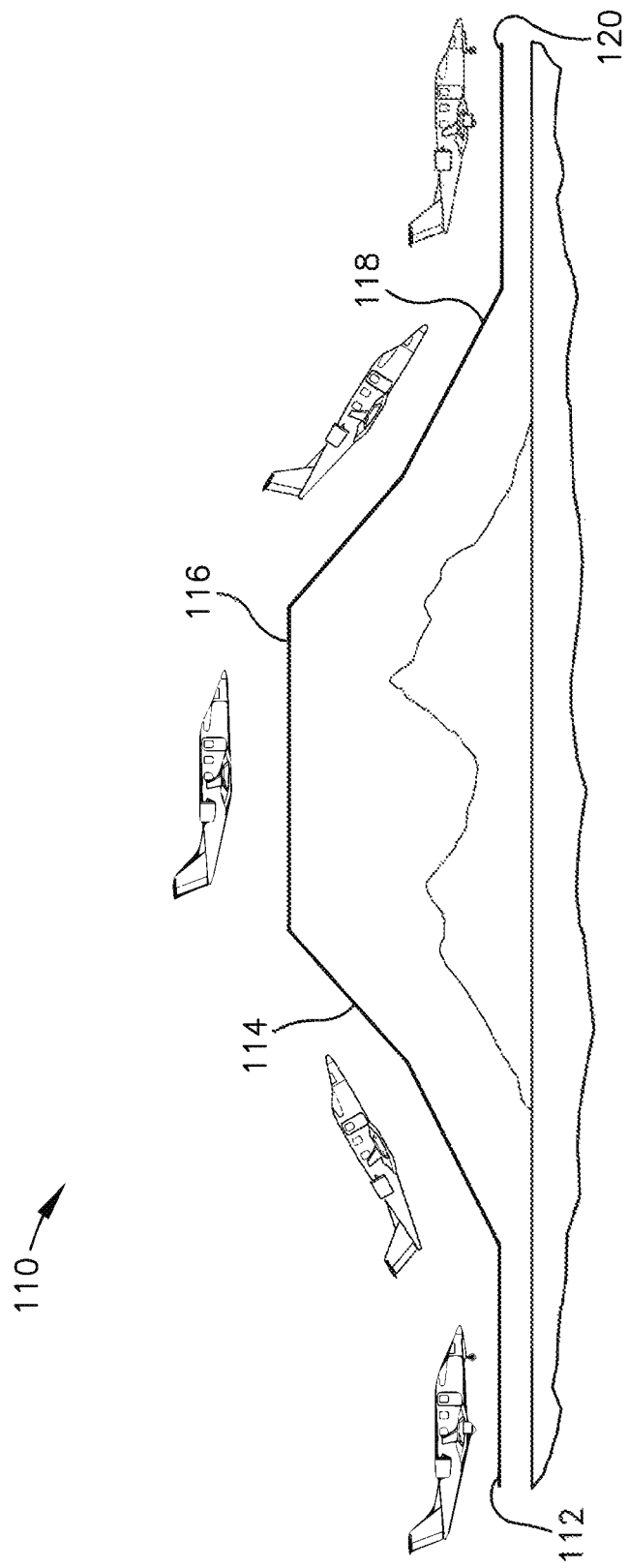
FIG. 13 depicts an exemplary flight plan of embodiments of the aircraft.

The embodiment of the aircraft 10 depicted in FIGS. 1-7 and 12 may be a twin ducted-fan reciprocating V8 engine with a continuously variable transmission. Turning to FIG. 13 for an exemplary flight plan 110 of the embodiment of the aircraft 10. Prior to flight, the aircraft may be fueled with standard octane gasoline. The aircraft 10 may be inspected conveniently and easily inspecting the engine 64 and transmission 82 compartments 36 using the access panels 34. The aircraft 10 engine 64 may be started and warm to normal operating temperature very quickly due to the liquid cooled exhaust system 70 reducing the exhaust temperature thus regulating the temperature of the catalytic converter. The fuel may run lean into the engine 64 causing the engine 64 to heat quickly to operating temperature and the resulting heat used to quickly heat the cabin 38. The resulting quick heating both results in a low amount of fuel used on the tarmac and reduced wear on the engine 64 starting in cold conditions.

Since the cabin 38 is warm, the five passengers may enter the cabin 38 and place luggage in a luggage hold. The aircraft 10 may proceed to the runway for the takeoff 110. The noise of the aircraft 10 is low such that it may takeoff from any airport at any time as the maximum noise of the aircraft 10 is lower than any airport regulations. The low noise may be due to the modern engine 64 and fuselage 30 insulation as well as the muffler 78 and silencer 80 style exhaust pipe. The fan 84 noise may also be reduced by the duct 90 surrounding the fan 84 and the noise insulating hub 98.

During takeoff 112, the engine 64 may be pushed to 100% providing the maximum RPM to the fan 84. In embodiments, the maximum engine 64 RPM may be approximately 5,500 RPM and the maximum fan 84 RPM may be 6,500. Throughout all stages the average fan blade tip 108 speed of the fan blades 84 may maintain approximately a 0.97 fan-Mach ratio. This speed increases the propulsive efficiency as described above. Due to the lean fuel mixture and efficient performance characteristics as described above, the aircraft 10 may match or surpass the takeoff performance of similar weight general aviation aircraft. During takeoff 112, the fuel intake may be 22 to 26 gallons per hour during takeoff rotation and initial climb.

The propulsive efficiency throughout takeoff 112 may be impacted by the duct 90 configuration as well. A straight duct inlet 100 may result in flow separation at low speeds causing drag and degraded fan blade 86 performance. In the embodiment as depicted in FIG. 10, the inlet 100 may protrude outwards causing the airflow to stay attached to the inlet 100 at low speeds. A straight duct inlet configuration may be optimal at cruise but result in flow separation at low speeds. The impact of the outward projected inlet 100 may have a small negative impact at cruise but may be optimal across all flight phases combined.

The configuration of the aircraft 10 may also be beneficial during takeoff 110. Elevated ducted-fans 32 may negate foreign object debris from the runway. Further, the wings 12 may also shield the ducted-fans 32 from runway debris adding a secondary layer of protection.

During the climb phase 114, the engine may be reduced to 80% thrust. The gear ratio may be adjusted with the continuously variable transmission to maintain the 0.97 Mach speed at the fan blade tips as the altitude increases and the atmospheric conditions change. The fan blade pitch may be adjusted to maintain thrust requirements while holding the engine 64 to approximately 80% power and fan blade tips 108 to 0.97 Mach. Under these conditions combined with a lean fuel mixture provided by the liquid cooled exhaust manifold, the climb phase 114 may result in a fuel consumption rate of approximately 18 to 19 gallons per hour.

Duct 90 efficiency may increase as the aircraft 10 accelerates to cruise 116. During cruise 116 the duct 90 may not be the most efficient design but the losses may be outweighed by the gains at other flight phases. The inlet 100 may be configured to be straight to increase cruise efficiency for long flights. The savings for cruise 116 as well as for the other flight phases may be weighed to determine the best configuration for a particular aircraft 10 operation.

During cruise 116, the aircraft 10 levels off. The aircraft 10 may be neutrally stable as described above. Small inputs may have large effects. This is beneficial in that it allows the aircraft 10 to maintain close to optimal flight conditions with very small perturbations. The aircraft 10 may have a cruise altitude of 29,000 feet, allowable by the liquid cooled exhaust system 70 in conjunction with the environmental control system. The drag may be reduced as the elevator 24 at straight and level flight may be set to zero inducing zero drag. Dual turbochargers 68 keep the engine 64 turbonormalized at sea level, or other standard pressure. The engine 64 RPM may stay within a range of 2,200 to 2,800 with a true airspeed of 325 knots and the fuel consumption rate may drop to approximately 9 gallons per hour.

During descent 118, the thrust may be reduced by decreasing fan blade 86 pitch or reducing the fan 84 RPM or a combination of both. Though the engine 64 pressure and fuel to air ratio may remain constant based on the turbonormalization, the engine 64 may continue at the cruise RPM or reduce based on the most efficient fuel consumption for the flight phase.

During landing 120, the engine 64 and fan 84 RPM may be increased based on the necessary landing requirements. Flaps 16 may be implemented for increased lift and decreased speed. In embodiments, spoilers may be available for reducing the aircraft 10 speed more quickly. Due to noise mitigation techniques implemented on the aircraft 10 the noise level may never exceed that of the airport restrictions.

Though the exemplary flight 110 as conducted was with all flight phases optimized, any flight phase may have optimal engine 64, fan 84, fan blade 86, duct 90, and hub 98 geometry and operational conditions optimized. The Optimal conditions may also be averaged over all flight phases for a propulsion system configuration that may not be the most optimal for any one flight phase, but provides a best condition based on all phases and the distance or time of a particular flight plan 110. For example, as described above the flight plan 110 may be short providing a short cruise time. The shortened cruise time may provide a condition for optimizing over all flight conditions. In embodiments, the aircraft 10 may be a long-range aircraft and optimizing for cruise 116 may be the best approach.

Alternative Embodiments

The aircraft 10 described above may be one embodiment of a general aviation aircraft and an exemplary flight plan. However, this is one embodiment and the aircraft 10 may have many alternative users. Alternative embodiments of the aircraft 10 are presented below.

The efficiency of the aircraft 10 propulsion system described above promotes a long endurance aircraft capable of surveillance or long range strategic bombing runs. A long range unmanned aircraft 10 may be developed and capable of an altitude of 45,000 feet, a range of greater than 6,000 nautical miles, endurance of more than 24 hours, and a low loiter speed of 160 knots.

In embodiments, the aircraft 10 may be a military combat aircraft. The aircraft 10 may be single seat manned or unmanned equipped with missiles and radar/laser guided weapons. The combat aircraft may be subsonic with a cruise altitude of 35,000 feet a range of 3,000 nautical miles and endurance of 10 hours. The combat aircraft may also be used as an air force trainer.

In an exemplary embodiment as depicted in FIG. 14, the aircraft 10 may be a military stealth aircraft, the stealth aircraft 122. The stealth aircraft 122 propulsion system may be configured similarly or the same as the general aviation aircraft as described above. Because of the noise mitigation techniques used on the stealth aircraft 122, the stealth aircraft 122 may be near silent. Since the exhaust system 70 is liquid cooled and the engine 64 is housed within the fuselage 30 no heat trail may be tracked. The stealth aircraft 122 may be configured with radar absorbing material 124 and may be geometrically designed to reduce the vehicle radar cross-section such as with a V-tail 126 and high degrees of angularity to deflect radar upward. Due to the characteristics described above, the stealth aircraft 122 may be virtually invisible. In embodiments, the stealth aircraft 122 may be autonomous or manned depending on the mission objectives.

Though the stealth aircraft 122 as depicted is a similar configuration to the general aviation embodiment of the aircraft 10, the stealth aircraft 122 may also be a blended body or a flying wing design. The blended body and flying wing configuration may help reduce the radar cross-section of the aircraft by providing limited reflective surfaces. In these configurations, it is not ideal to have control surfaces deflected because the control surfaces provide radar reflective surfaces. The stealth aircraft 122 blended body and flying wing configurations may employ differential thrust and thrust vectoring for additional control.

In embodiments, the aircraft 10 may be a Short Takeoff and Landing (STOL) or Vertical Takeoff and Landing (VTOL) aircraft. The aircraft 10 may be configured with rotating ducted-fans 32 and smaller stabilizing fans (not shown) aft and forward of the center of gravity. The ducted-fans 32 may rotate to provide components of vertical thrust that allow the aircraft 10 to takeoff in short distances or vertically. The STOL/VTOL aircraft 10 may be autonomous or manned.

Any embodiment of the aircraft 10 as described may be configured to operate as a manned or autonomous ground support vehicle, amphibious aircraft, and surveillance aircraft. The aircraft 10 may also serve as a cruise missile or water surface missile. The aircraft 10 may takeoff from short runways, ground surfaces, aircraft carriers or may be launched from a drone launching device.

Any configurations that meet FAA requirements may meet these requirements for United States certification. The aircraft 10 may be configured to meet the requirements of any other country the aircraft may fly. For example, the aircraft may fly to Canada and meet all regulations of the Transport Canada Civil Aviation, or fly to England and meet all requirements of the UK Civil Aviation Authority.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A propulsion system for an aircraft, comprising:
   a reciprocating engine;
   a continuously variable transmission,
   wherein the reciprocating engine and the continuously variable transmission are housed within a fuselage of the aircraft;
   a liquid cooled exhaust system; and
   a ducted fan assembly configured to be powered by the reciprocating engine via a drive shaft connected to the continuously variable transmission,
   wherein the ducted fan assembly is configured to be mounted to the exterior of the fuselage,
   wherein the ducted fan assembly comprises at least three blades and one stator,
   wherein the drive shaft is configured to be at least partially housed within the one stator.

2. The propulsion system of claim 1, comprising at least one other ducted fan assembly;
   wherein the other ducted fan assembly comprises at least five blades, and
   wherein the other ducted fan assembly is configured to be mounted on the exterior of the fuselage.

3. The propulsion system of claim 2,
   wherein the ducted fan assembly and the other ducted fan assembly comprise ducted fans that are configured to rotate in opposite directions, and
   wherein the ducted fans are configured to maintain a near constant blade tip speed of at least 97% the speed of sound during at least one flight phase.

4. The propulsion system of claim 1, wherein the reciprocating engine comprises eight pistons.

5. The propulsion system of claim 1, wherein the reciprocating engine and exhaust is liquid cooled and the exhaust is filtered through a catalytic converter.

6. The propulsion system of claim 1,
   wherein the ducted fan assembly comprises a duct, and
   wherein the duct diameter is larger at the inlet than the outlet.

7. The propulsion system of claim 6, wherein the duct houses at least three stators for directing the airflow aft of the fan.

8. The propulsion system of claim 1, wherein the engine is double cradle mounted to the frame of the aircraft within the fuselage.

9. The propulsion system of claim 1, wherein a turbocharger compresses engine inlet air to maintain turbonormalization throughout at least two flight phases.

10. The propulsion system of claim 9, wherein an intercooler cools the engine inlet air and is an air-to-water intercooler.

11. A propulsion system for an aircraft, comprising:
    a reciprocating engine;
    a continuously variable transmission, wherein the reciprocating engine and the continuously variable transmission are housed within a fuselage of the aircraft;

a liquid cooled exhaust system; and a ducted fan assembly powered by the reciprocating engine via a drive shaft connected to the continuously variable transmission, wherein the ducted fan assembly is configured to be mounted to the exterior of the fuselage, wherein the ducted fan assembly comprises at least three blades and one stator, wherein the drive shaft is configured to be at least partially housed within the one stator, wherein a turbocharger is configured to compress engine inlet air to maintain a constant temperature and pressure during at least one flight phase; and an intercooler configured to cool exhaust air prior to the exhaust air entering a catalytic converter.

12. The propulsion system of claim 11, wherein the reciprocating engine comprises at least eight pistons and provides at least 350 horsepower.

13. The propulsion system of claim 12, wherein a crankshaft of the reciprocating engine revolves within a range of 2,200 to 2,800 revolutions per minute.

14. The propulsion system of claim 11, wherein the ducted fan assembly comprises fan blades, and wherein the fan blade pitch is adjusted to maintain straight and level flight.

15. The propulsion system of claim 14, wherein the fan blades are configured to rotate with a fan blade tip speed of a near constant 97% the speed of sound at any given altitude.

* * * * *